United States Patent
Foo et al.

(10) Patent No.: US 12,121,852 B2
(45) Date of Patent: Oct. 22, 2024

(54) APPARATUS COMPRISING A CONTAMINANT-RESISTANT AND NON-CORROSIVE DESICCANT COMPOSITE WITH HIGH MOISTURE CAPACITY

(71) Applicant: W. L. Gore & Associates, Inc., Newark, DE (US)

(72) Inventors: Guo Shiou Foo, Newark, DE (US); Thomas B. Cooper, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 311 days.

(21) Appl. No.: 17/615,329

(22) PCT Filed: May 28, 2019

(86) PCT No.: PCT/US2019/034160
§ 371 (c)(1),
(2) Date: Nov. 30, 2021

(87) PCT Pub. No.: WO2020/242454
PCT Pub. Date: Dec. 3, 2020

(65) Prior Publication Data
US 2022/0219116 A1   Jul. 14, 2022

(51) Int. Cl.
*B01D 53/22*   (2006.01)
*B01D 53/26*   (2006.01)
*B01D 53/28*   (2006.01)

(52) U.S. Cl.
CPC ........... *B01D 53/28* (2013.01); *B01D 53/261* (2013.01); *B01D 2253/102* (2013.01);
(Continued)

(58) Field of Classification Search
CPC ........ B01D 2253/202; B01D 2253/311; B01D 2253/102; B01D 53/28; B01D 2257/80;
(Continued)

(56) References Cited

U.S. PATENT DOCUMENTS 2,241,600 A * 5/1941 Hunsicker ............ B01D 53/261
                                                          252/194
4,500,333 A * 2/1985 Blytas .................... B01D 53/28
                                                          62/928
(Continued)

FOREIGN PATENT DOCUMENTS

CN    105035492 A    11/2015
CN    107456945 A    12/2017
(Continued)

OTHER PUBLICATIONS

Daou et al., "Development of a new synthesized adsorbent for refrigeration and air conditioning applications," Applied Thermal Engineering (Jun. 28, 2005); 26(1):56-65.
(Continued)

*Primary Examiner* — Anthony R Shumate

(57) ABSTRACT

A device that retains high moisture capacity in the presence of certain contaminants. The device can include a substrate and a desiccant. The device can be configured in relation to an enclosure such that the device absorbs and desorbs moisture from the enclosure.

20 Claims, 20 Drawing Sheets

(52) U.S. Cl.
CPC .. *B01D 2253/202* (2013.01); *B01D 2253/204* (2013.01); *B01D 2253/25* (2013.01); *B01D 2253/306* (2013.01); *B01D 2253/311* (2013.01); *B01D 2253/34* (2013.01); *B01D 2257/80* (2013.01)

(58) Field of Classification Search
CPC .............. B01D 2253/34; B01D 53/261; B01D 2253/25; B01D 2253/306; B01D 2253/204

See application file for complete search history.

(56) References Cited

U.S. PATENT DOCUMENTS

| | | | |
|---|---|---|---|
| 5,773,105 A | 6/1998 | Klett | |
| 7,726,319 B1* | 6/2010 | Boyce | A61L 27/3691 |
| | | | 623/923 |
| 10,625,049 B2* | 4/2020 | Cully | A61M 25/0045 |
| 10,808,998 B1* | 10/2020 | Cooper | B01D 53/261 |
| 2002/0026872 A1* | 3/2002 | Smith | B01D 53/261 |
| | | | 502/400 |
| 2010/0258494 A1* | 10/2010 | Freudenschuss | B01J 20/10 |
| | | | 210/287 |
| 2011/0011805 A1 | 1/2011 | Schubert et al. | |
| 2011/0118169 A1* | 5/2011 | Bergstrom | D06F 58/203 |
| | | | 510/517 |
| 2012/0097030 A1* | 4/2012 | Haas | F02M 37/30 |
| | | | 96/112 |
| 2014/0026749 A1* | 1/2014 | Becker | B01D 53/263 |
| | | | 95/91 |
| 2016/0363331 A1 | 12/2016 | Keough et al. | |
| 2018/0178195 A1* | 6/2018 | Kim | B01J 20/28035 |
| 2021/0069639 A1* | 3/2021 | Wang | B01J 20/28026 |
| 2023/0327183 A1* | 10/2023 | Matsuo | H01M 10/0562 |
| | | | 429/314 |

FOREIGN PATENT DOCUMENTS

| | | |
|---|---|---|
| JP | 09-295680 A | 11/1997 |
| JP | 2005-022158 A | 1/2005 |
| JP | 2011-143358 A | 7/2011 |
| JP | 2012-066157 A | 4/2012 |
| JP | 2018-525210 A | 9/2018 |
| KR | 10-2010-0118580 A | 11/2010 |
| WO | 99/12641 A1 | 3/1999 |
| WO | 2018067944 A1 | 4/2018 |
| WO | 2019/010433 A2 | 1/2019 |

OTHER PUBLICATIONS

International Preliminary Report on Patentability received for PCT Patent Application No. PCT/US2019/034160, mailed on Dec. 9, 2021, 12 pages.

International Search Report and Written Opinion received for PCT Patent Application No. PCT/US2019/034160, mailed on Jan. 29, 2020, 15 pages.

Bavnhøja et al., "The role interplay between mesoporous silica pore volume and surface area and their effect on drug loading capacity", International Journal of Pharmaceutics: X, vol. 1, 2019, pp. 1-5.

* cited by examiner

APPARATUS COMPRISING A CONTAMINANT-RESISTANT AND NON-CORROSIVE DESICCANT COMPOSITE WITH HIGH MOISTURE CAPACITY

FIELD

The present disclosure relates to a device that retains high moisture capacity in the presence of certain contaminants.

BACKGROUND

Many items are susceptible to damage caused by excessive moisture. For instance, electrical and electronic items may be ruined or altered due to excessive moisture. Similarly, enclosed components, e.g., those contained in a housing, that undergo thermal cycling are susceptible to moisture related problems. Examples of enclosures which are susceptible to undesirable moisture include, for example, automotive headlamp units, solar inverters, electronics contained in enclosed housings, and other systems where on/off cycling of a heat source within an enclosure results in moisture build-up.

One way of managing moisture in an enclosure is to place a drying agent or desiccant within the enclosure. However, contaminants within the enclosure can affect the performance of the desiccant and cause corrosion within the enclosure. Accordingly, there is a need for an apparatus having improved desiccant performance and reduced corrosion.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

In some embodiments, the disclosure is directed to an apparatus comprising: an enclosure; wherein one or more contaminants and water vapor are within an internal volume of the enclosure; a device; wherein the device is positioned at least partially within the enclosure or outside of the enclosure and sufficiently close to the enclosure to allow moisture to travel between the device and the internal volume of the enclosure to absorb water vapor within the internal volume of the enclosure; wherein the device comprises: a substrate loaded with a desiccant; wherein the substrate comprises at least one polymer material; wherein 50 to 90 wt % of the substrate is loaded with the desiccant; wherein the desiccant comprises: calcium chloride salt; wherein 20 wt % to 70 wt % of the support material is impregnated with the calcium chloride salt; wherein a water vapor capacity of the desiccant does not decrease by more than 17% after undergoing up to 384 adsorption/desorption cycles.

In some embodiments, the present disclosure is directed to method comprising the steps of: (a) obtaining a device comprising: a substrate loaded with a desiccant; wherein the substrate comprises at least one polymer material; wherein 50 to 90 wt % of the substrate is loaded with the desiccant; wherein the desiccant comprises: a calcium chloride salt; wherein 20 wt % to 70 wt % of the support material is impregnated with the calcium chloride salt; (b) positioning the device at least partially within an internal volume of an enclosure or outside of the enclosure and sufficiently close to the enclosure to allow moisture to travel between the device and the enclosure; wherein the enclosure comprises one or more contaminants and water vapor within the internal volume; (c) absorbing moisture into the device from the internal volume of the enclosure; (d) desorbing moisture from the device to complete an absorption/desorption cycle; and repeating steps (c)-d); wherein a water vapor capacity of the device does not decrease by more than 17% after undergoing up to 384 absorption/desorption cycles.

In some embodiments, the device is fully within the enclosure.

In some embodiments, the device is partially within the enclosure.

In some embodiments, the enclosure comprises a sufficient amount of water vapor to provide a relative humidity of from 15% to 60%.

In some embodiments, the device is in contact with the enclosure.

In some embodiments, the device is attached to an outer surface of the enclosure.

In some embodiments, the device is in fluid communication with the enclosure.

In some embodiments, the absorption/desorption of the desiccant is configured to be driven by a temperature gradient between the device and a heat source.

In some embodiments, the absorption/desorption of the desiccant is configured to be driven by a moisture gradient between the enclosure and the device.

In some embodiments, a water vapor capacity of the substrate loaded with the desiccant does not decrease by more than 17% after undergoing the up to 384 absorption/desorption cycles.

In some embodiments, 20 wt % to 65 wt % of the support material is impregnated with the calcium chloride salt.

In some embodiments, 70 wt % to 80 wt % of the substrate is loaded with the desiccant.

In some embodiments, the enclosure is comprised of at least one corrodible metal.

In some embodiments, the at least one corrodible metal comprises one of more of stainless steel, copper, or aluminum.

In some embodiments, the stainless steel is 304 stainless steel.

In some embodiments, the copper is C122 copper.

In some embodiments, the aluminum is 6061 aluminum.

In some embodiments, the support material has a pore volume ranging from 0.2 to 2.10 $cm^3/g$.

In some embodiments, the support material has a pore volume ranging from 0.42 to 1.90 $cm^3/g$.

In some embodiments, the support material has a surface area ranging from 273 to 1534 $m^2/g$.

In some embodiments, the support material is comprised of a metal oxide.

In some embodiments, the metal oxide comprises one or more of aluminum oxide or silicon dioxide.

In some embodiments, the support material comprises activated carbon.

In some embodiments, the support material comprises a metal organic framework.

In some embodiments, the metal organic framework is UiO-66.

In some embodiments, the substrate is in the form of a tape.

In some embodiments, the tape is a diced tape.

In some embodiments, the substrate is in the form of a tube.

In some embodiments, the substrate is in the form of a disc.

In some embodiments, there is at least one additional polymer material

In some embodiments, the at least one additional polymer material comprises at least one polymer membrane positioned on at least one side of the substrate.

In some embodiments, the at least one polymer material comprises a fluoropolymer.

In some embodiments, the at least one polymer material comprises an expanded fluoropolymer.

In some embodiments, the expanded fluoropolymer is expanded polytetrafluoroethylene (ePTFE).

In some embodiments, the at least one polymer material comprises poly(ethylene-cotetrafluoroethylene) (ETFE), ultrahigh molecular weight polyethylene (UHMWPE), polyparaxylylene (PPX), polylactic acid, and any combination or blend thereof.

In some embodiments, the one or more contaminants comprises one or more of: one or more siloxanes, one or more aliphatic alcohols, one or more aromatic alcohols, one or more nitrogen containing compounds, or one or more other organic compounds.

In some embodiments, the one or more siloxanes comprises one or more of: hexamethylcyclotrisiloxane, octamethylcyclotetrasiloxane, decamethylcyclopentasiloxane, dodecamethylcyclohexasiloxane, tetradecamethylcycloheptasiloxane, hexamethyldisiloxane, octamethyltrisiloxane, decamethyltetrasiloxane, or dodecamethylpentasiloxane.

In some embodiments, the one or more aliphatic alcohols comprises one or more of: 2-ethyl-hexanol or dodecanol.

In some embodiments, the one or more aromatic alcohols comprises one or more of: benzyl alcohol or 2,4-di-tert-butylphenol.

In some embodiments, the one or more nitrogen containing compounds comprises one or more of N-methyl-2-pyrrolidone, dibutylamine, dibutylformamide, or caprolactam.

In some embodiments, the one or more other organic compounds comprises one or more of: toluene, xylene, benzene, isopropyl benzene, trimethyl benzene, tetramethylbenzene, naphthalene, caprolactam, 1-hydroxycyclohexyl phenyl ketone, acetophenone, benzaldehyde, heptanal, hexanal, octahydro-4,7-methano-1H-indene, dipropylene glycol, diethylene glycol, diacetylbenzene, butanediol adipate, diphenyl sulfone, propylene carbonate, or tetradecane.

In some embodiments, each absorption/desorption cycle is a thermal cycle, during which, the desiccant is configured to be repeatedly heated and cooled between temperatures ranging from −20° C. to 150° C.

In some embodiments, each absorption/desorption cycle is a moisture cycle, during which the desiccant is exposed to air having a relative humidity of from 20% to 95% so as to create a moisture gradient between the desiccant and the air.

In some embodiments, the at least one additional polymer material is configured to decrease the transfer of desiccant particles from the device into the enclosure from 50% to 97% relative to a device with only a single polymer material.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
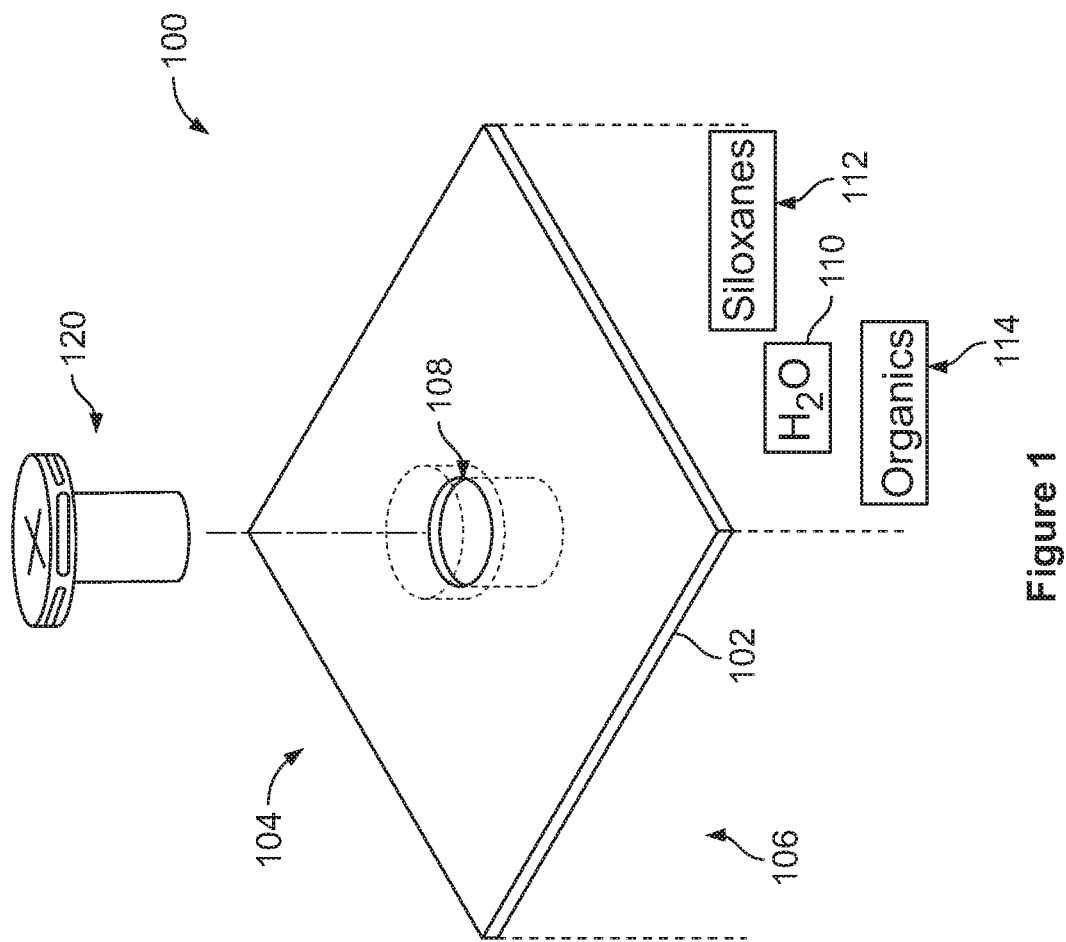
FIG. 1 is a perspective view of an exemplary apparatus according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

As used herein, the terms "cooled" or "cooling" refer to active cooling, passive cooling, or combinations thereof. "Passive cooling" means that an object is cooled by removing a heat source and allowing the object to be cooled by exposure to an environment having a lower temperature than that of the object. "Active cooling" refers to any type of cooling other than "passive cooling." Examples of mechanisms for "active cooling" include, but are not limited to: a fan or a refrigerant.

As used herein, "fluid" means a liquid or a gas.

As used herein, "relative humidity" means "the amount of water vapor present in a volume of air expressed as a percentage of the amount needed for saturation of the same volume of air at the same temperature."

Certain embodiments of the present disclosure relate to an apparatus having an enclosure.

In some embodiments, the apparatus can comprise a housing comprising a first chamber having a heater, at least one adsorption port into the first chamber, and a valve assembly located within the housing and being configured to transition between an adsorption position and a desorption position. In some embodiments, the device described herein is positioned in the heating chamber.

In some embodiments, the apparatus and the device are incorporated into at least one of: a moisture pump assembly or a heating pump assembly. In some embodiments, the moisture pump assembly and/or the heating pump assembly includes a housing and a valve assembly located within the housing. In some embodiments, the valve assembly is configured to be transitioned between an adsorption position and a desorption position. In some embodiments, the housing comprises a first chamber having a heater, at least one adsorption port into the first chamber. In some embodiments, the device is disposed proximate to the at least one adsorption port. In some embodiments, the housing comprises a condensation chamber, and a venting port leading out of the condensation chamber. In some embodiments, the adsorption position is configured to seal a desorption port between the heating chamber and the condensation chamber and opens the adsorption port into the heating chamber for water vapor transmission into the heating chamber. In some embodiments, the desorption position seals the adsorption port and opens the desorption port between the heating chamber and the condensation chamber for water vapor transmission out of the heating chamber.

In some embodiments, the apparatus comprises a housing configured to retain an electronic device that thermally cycles; an inlet in the housing; and a protective vent inserted into the inlet of the housing. In some embodiments, the protective device comprises a rigid body having a port therein to allow airflow therethrough. In some embodiments, the electronic device may be a solar inverter.

In some embodiments, the apparatus according to the present disclosure can take the form of an enclosure assembly, as shown in FIG. 1. Particularly, the exemplary embodiment of FIG. 1 depicts a perspective view of an enclosure assembly 100 including a casing 102 defining an enclosure and separating an outside environment 104 from an inside atmosphere 106. In some embodiments, the casing forms at least one of an air-tight, a moisture-tight, and a water-tight seal so that the only air passage between the outside environment 104 and the inside atmosphere 106 is through inlet 108. As used herein, "outside" and "inside" are terms used to describe spaces relative to the casing 102, which are, for example, on opposite sides of the casing. As shown in FIG. 1, a protective vent 120 can be inserted in an inlet 108. Airflow can pass through the protective vent 120 and this can equalize the pressure within the casing 102. Protective vent 120 may have a rigid body and port. In some embodiments, protective vent 120 comprises the device comprising a substrate loaded with the calcium chloride-containing desiccant described herein. Although not shown in FIG. 1, the casing may comprise an electronic device, such as a solar inverter, that thermally cycles. For automobile applications this can include a light bulb for a headlamp. The thermal cycling causes moisture 110 to buildup in the inside atmosphere 106. The presence of moisture 110 can reduce the useful lifecycle of the heating source or other components, especially electric or electronic components within the casing. In addition, due to off-gassing or external contamination, the inside atmosphere 106 may also comprise one or more contaminants such siloxanes 112 and/or organics 114.

Figure 2:
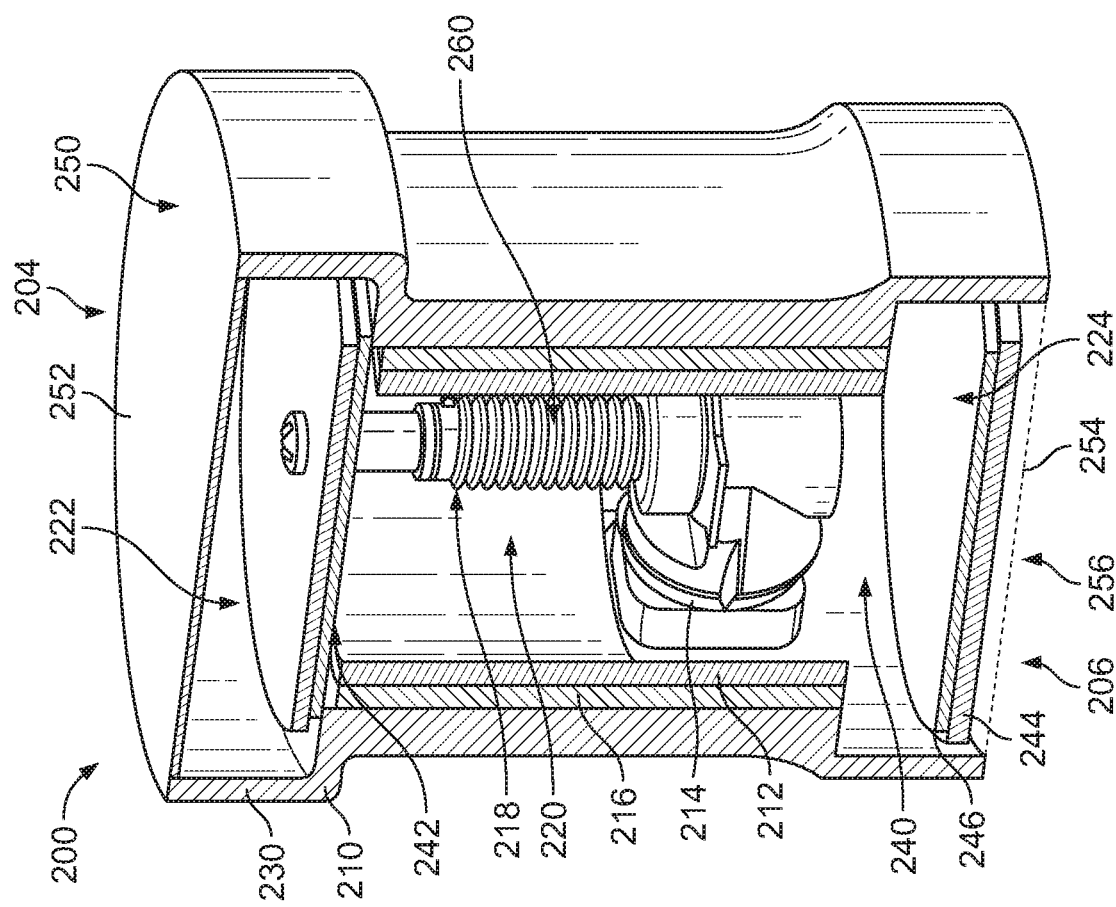
FIG. 2 is a perspective view of an exemplary apparatus according to the present disclosure in the form of a moisture pump in a desorbing configuration.
Figure 3:
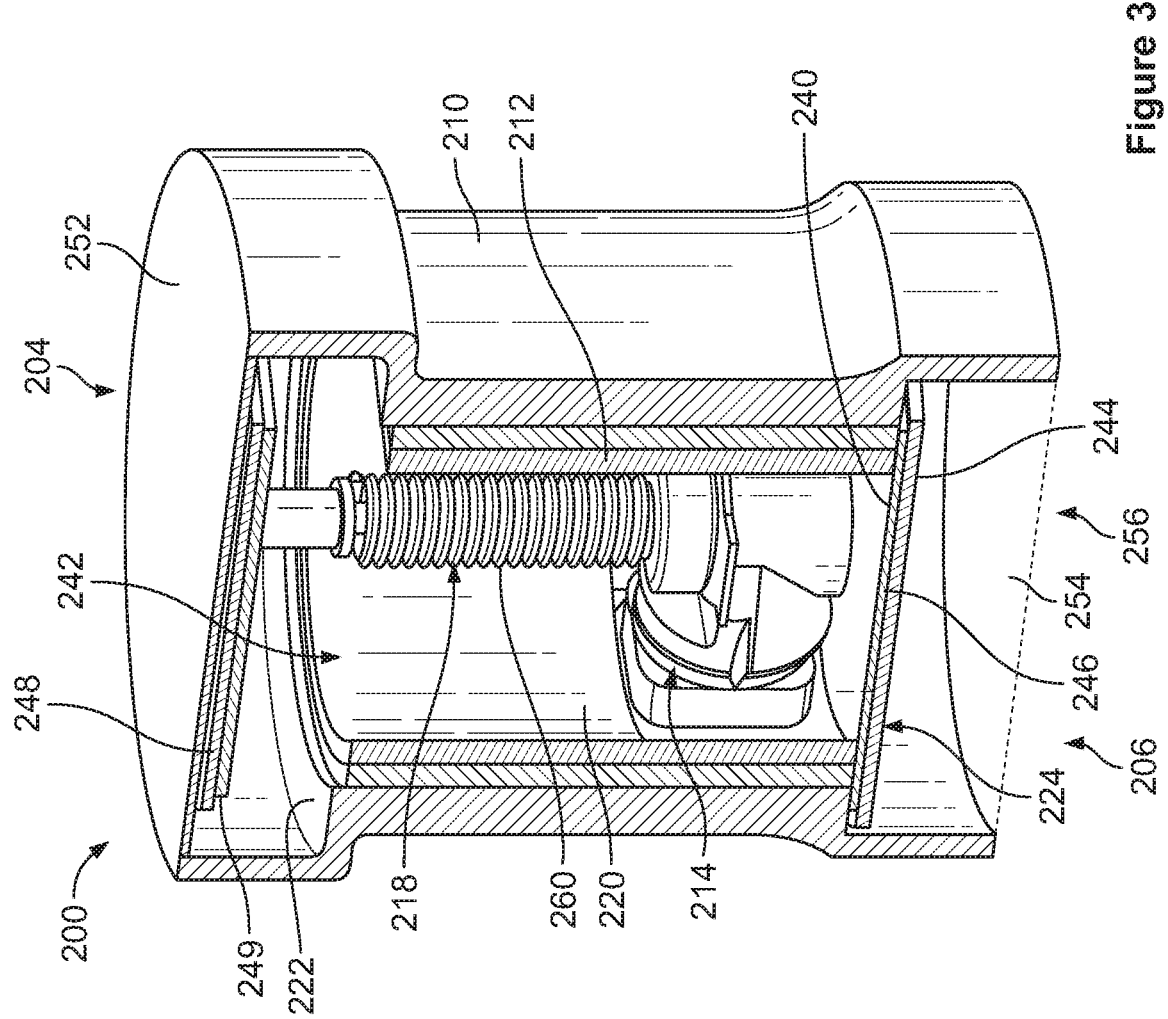
FIG. 3 is a perspective view of an exemplary apparatus according to the present disclosure in the form of a moisture pump in an absorbing configuration.

In the exemplary embodiment shown in FIGS. 2 and 3, there is a cutaway perspective view of an apparatus in the form of a moisture pump. The moisture pump 200 can have a pump housing 210 (shown in partial cutaway), a device comprising a substrate loaded with the calcium chloride-containing desiccant described herein (shown in partial cutaway), a heater 214, a heat spreader 216 (shown in partial cutaway) that may function as a heat sink, and a valve assembly 218 (shown in partial cutaway) that is configured to be transitioned to selectively allow water vapor transmission into and out of one or more chambers 220, 222, 224 defined by the pump housing 210. The moisture pump 200 can operate to remove moisture from the inside atmosphere 206 that enters the moisture pump 200 and return the moisture to the outside environment 204 by exiting the moisture pump 200. The device 212 is configured to adsorb water vapor from the air, generally, when not heated. As shown in FIG. 2, the moisture pump 200 is an adsorbing position. FIG. 3 shows a moisture pump in a desorbing position. As shown, the moisture pump 200 has a rotationally symmetrical shape with cylindrical parts, although a variety of shapes are contemplated.

Also, as shown in FIGS. 2 and 3, the pump housing 210 also has an adsorption port 240, a desorption port 242, and a venting port 244. The adsorption port 240 provides an area for water vapor transmission into the heating chamber 220 and the desorption port 242 provides an area for water vapor transmission out of the heating chamber 220 into the condensation chamber 222. As shown, the desorption port 242 is positioned between the heating chamber 220 and the condensation chamber 222 and generally corresponds to the area where the pump housing 210 necks down in diameter, although a variety of configurations are contemplated. As will be described in greater detail, the chambers 220, 222, 224 are typically either selectively or continuously separated by valve and/or filter (e.g., membrane) structures. The heater 214 directs heat to the heat spreader 216 for heating the desiccant 212. In operation, the heater 214 is selectively powered to generate heat. Though a portion of the heat may be dissipated through the air (e.g., via convection) or other components, generally a significant portion of generated heat is adsorbed into the heat spreader 216. At least a portion of the heat in the heat spreader 216 is adsorbed (e.g., via conduction) into the device 212. Water vapor adsorbed in the device 212 is heated and released from the device 212 into air in the heating chamber 220, for example. When the heater 214 is not powered, and the device 212 is sufficiently cooled, the device 212 adsorbs water vapor from the air.

The valve assembly 218 includes an actuator 260 configured to transition the valve assembly 218 relative to the housing 210 between a first position and a second position. In one embodiment, when the heater 214 delivers heat to the heating chamber 220, the actuator 260 and the device 212 are heated through heat spreader 216. In response, the actuator 260 expands, and the device 212 desorbs moisture to the heating chamber 220. When the heater 214 does not deliver heat to the heating chamber 220, actuator 260 and the device 212 cool down. In response, the actuator 260 contracts, and the device 212 adsorbs water vapor from the air of the heating chamber 220. In other embodiments, the actuator may be a thermomechanical actuator responsive to temperature, such as a phase change material. Non-limiting examples of phase change materials include wax (e.g., paraffin wax), bimetal elements, and Nitinol.

Various embodiments of the moisture pump 200 include one or more membranes. Membrane 252 covering the vent port 250 prevents solid debris from entering or leaving the moisture pump 200, such as preventing particles freed from or dusted off the device 212 from leaving the pump housing 210 and entering the outside environment 204. Membrane 252 also prevents particles (e.g., dust) from entering from the outside environment 204. An optional membrane 254 may be used to cover the inlet port to prevent particles freed from or dusted off the device 212 from leaving the pump housing 210 and entering the inside atmosphere 206.

Another purpose of the one or more membranes 252, 254 is to allow air and water vapor to be transmitted therethrough. Yet another purpose of the one or more membranes 252, 254 is to prevent liquid water from being transmitted therethrough. Still another purpose of the one or more membranes is to discourage oils from building up on the membrane. In some embodiments, the one or more membranes are solid debris impermeable, air permeable, vapor permeable (e.g., water vapor permeable), water impermeable, and oleophobic in response to the one or more purposes selected. As illustrated, membrane 252 covers the venting port 250. Also, as illustrated, the optional membrane 254 covers the intake port 256 and is positioned between the pump housing 210 and an inside atmosphere 206 to prevent particles freed from the device 212 from entering the inside environment 206. In some embodiments, the membrane 250 is adhered to the pump housing 210. Examples of suitable membrane materials include ePTFE membranes, such as those described in U.S. Pat. Nos. 6,210,014, 6,709,493, and 8,968,063, the contents of which are incorporated herein by reference for all purposes.

In the desorption position shown in FIG. 3, the actuator 260 is expanded, or in an extended position. In transitioning to the desorption position, the valve assembly 218 seals the adsorption port 240 and opens the desorption port 242. In particular, the adsorption port cover 244 including a gasket 246 contacts the pump housing 210 to seal the adsorption port 240. During and/or for a desired period of time following a heating cycle, the valve assembly 218 is in the desorption position and heat is delivered to the heating chamber 220, particularly to the actuator 260 and the device 212. In response to the heat delivered by the heater 214, the actuator 260 expands and the device 212 begins to release moisture into the air. As shown, in either the desorption or adsorption positions the heater 214 remains in a fixed position relative to the pump housing 210 outside of the condensation chamber 222 of the pump housing 210.

Water vapor is free to be transmitted from the heating chamber 220 into the condensation chamber 210, for example, by diffusion. However, according to the operation illustrated in FIGS. 2 and 3, water vapor generally cannot be transmitted into the debris chamber 224 or internal atmosphere 206 due to the seal of the adsorption port cover 244 when the moisture pump 200 is in the desorption position. Accordingly, water vapor from the heating chamber 220 also generally cannot be transmitted out of the optional membrane 254. Heated water vapor in the condensation chamber 222 vents through membrane 252 or begins to condense on one or more surfaces in the condensation chamber 222.

In one embodiment, the moisture pump 200 having the condensation chamber 222 increases the moisture desorption from the device 212. This may allow the device 212 to remove more moisture.

Various embodiments of the disclosure facilitate appropriate timing between the valve assembly positions and the heating of the device 212 to eject moisture. Non-limiting examples of configurations, presented in the alternative or in combination, that facilitate appropriate timing include: setting the wax melting temperature of the actuator 260 lower than the desorption temperature of the device 212, locating the heater 214 closer to the actuator 260 and relatively further from the device 212 on the heat spreader 216, setting the cross sectional area of the heat spreader 216 to favor more transient heat flux to the actuator 260 than to the device 212, and selecting material properties of the heat spreader 216 to favor a high heat transfer rate to the actuator 260 before the device 212. Additionally, in some embodiments a microcontroller is optionally utilized to directly control heater temperature and duration and/or operation of an electronic (e.g., solenoid) rather than phase change actuator (not shown).

In some instances, after a selected amount of time, heat is no longer delivered to the heating chamber 220, and the valve assembly 218 seals the desorption port 240 to begin an evaporation cycle. The liquid water in the condensation chamber 222 is free to continue evaporation and water vapor remaining in the condensation chamber 222 is free to continue transmission out of the condensation chamber over a period of time while the moisture pump 200 remains in the adsorption position. Due to the seal of the desorption port 242 by desorption port cover 248, this moisture generally cannot re-enter the heating chamber 220 from condensation chamber 222. Desorption port cover 248 also has a gasket material 249 for sealing the desorption port 242 when in the adsorption position. Although not shown adsorption port cover 244 and desorption port cover 248 may be linked by one or more connectors so the covers move with the movement of the actuator 260. The device 212 is free to begin adsorbing moisture entering the heating chamber 220 through adsorption port 240. A person having skill in the art and the benefit of this disclosure would be able to select an appropriate time for heating, desorption, and adsorption in view of a particular application and moisture pump characteristics.

As shown in FIGS. 2 and 3 the valve area of adsorption port and desorption port is approximately equal. In one embodiment, it may be advantageous to use a heated moisture pump where the valve area of the absorption port is greater than that of the desorption port thus creating a valve area differential. This differential can advantageously increase the rate for capturing moisture without resorting to increasing the size. In one embodiment, the adsorption port and desorption port each respectively define an adsorption area and a desorption area, and the adsorption area is larger than the desorption area to provide a differential valve area. The adsorption port(s) comprises a plurality of openings in the housing arrayed in a parallel set, each opening being arranged perpendicular to a direction of travel of the valve assembly. Thus, the adsorption port comprises a plurality of openings in the housing to define an adsorption area. Each opening has a width in the direction of travel of the valve assembly that is approximately equal to a width of the desorption port. The valve assembly comprises a valve assembly having a plurality of openings therein that are arranged to align with the adsorption port openings when the valve assembly is in the adsorption position, and a plurality of blocking regions disposed between the openings that are arranged to align with and block the adsorption port openings when the valve assembly is in the desorption position. The desorption port has a width approximately equal to the width of each opening of the plurality of adsorption openings. The width of each opening of the plurality of adsorption openings is preferably less than or equal to the corresponding width of a respective blocking region of the valve assembly.

The adsorption port can comprise at least one opening in a wall of the housing that is proximate to and substantially parallel to the device. For example, the housing can contain a void therein and the opening(s) can be positioned parallel to a surface of the device and across the void from the device. Where the housing is a cylindrical barrel, the desiccant can be substantially cylindrical also and positioned inside the housing and separated from the housing by a void. In some embodiments, the wall of the housing at least partially surrounds the device and is removed by a distance, i.e. a distance that permits airflow between the wall of the housing and the device. In some embodiments, the valve assembly includes a valve assembly interior to the housing and slidingly mounted within the housing, the valve assembly being operable to cover the desorption port in the adsorption position, and operable to cover the at least one adsorption port in the desorption position.

For the embodiments with a differential valve area there may also be a second chamber, referred to as a condensation chamber, defined between a desorption port and a venting port. The venting port may have a membrane covering the venting port. The membrane can be water vapor permeable and liquid water impermeable. The valve assembly can be configured to be transitioned between an adsorption position in which the valve assembly seals the desorption port between the heating chamber and the condensation chamber with the desorption port cover and opens the adsorption port into the heating chamber for water vapor transmission into the heating chamber, and a desorption position in which the valve assembly seals the adsorption port with the adsorption port cover and opens the desorption port between the heating chamber and the condensation chamber for water vapor transmission out of the heating chamber.

Figure 4:
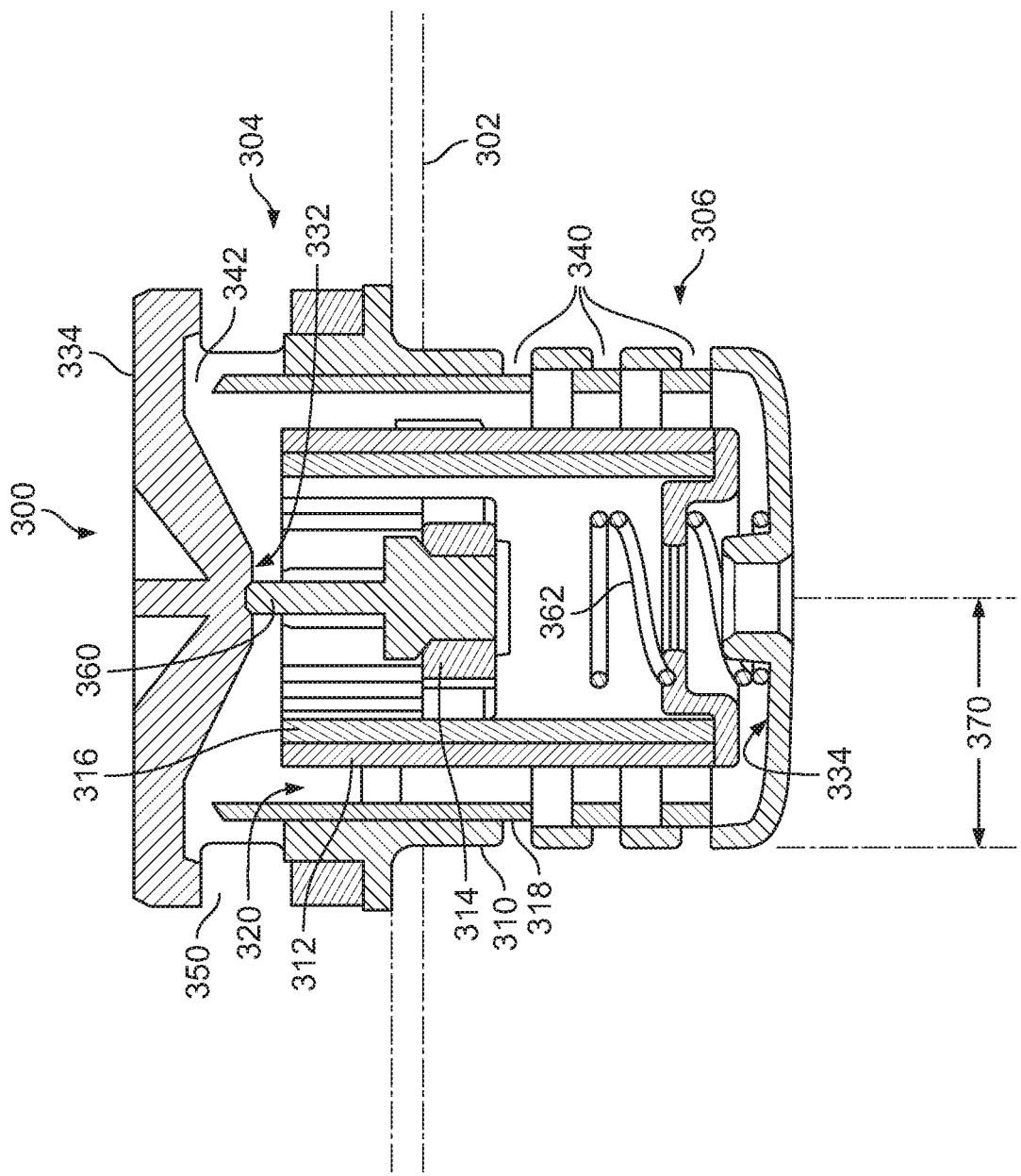
FIG. 4 is a perspective view of an exemplary apparatus according to the present disclosure in the form of a moisture pump having a differential valve in a desorbing configuration.
Figure 5:
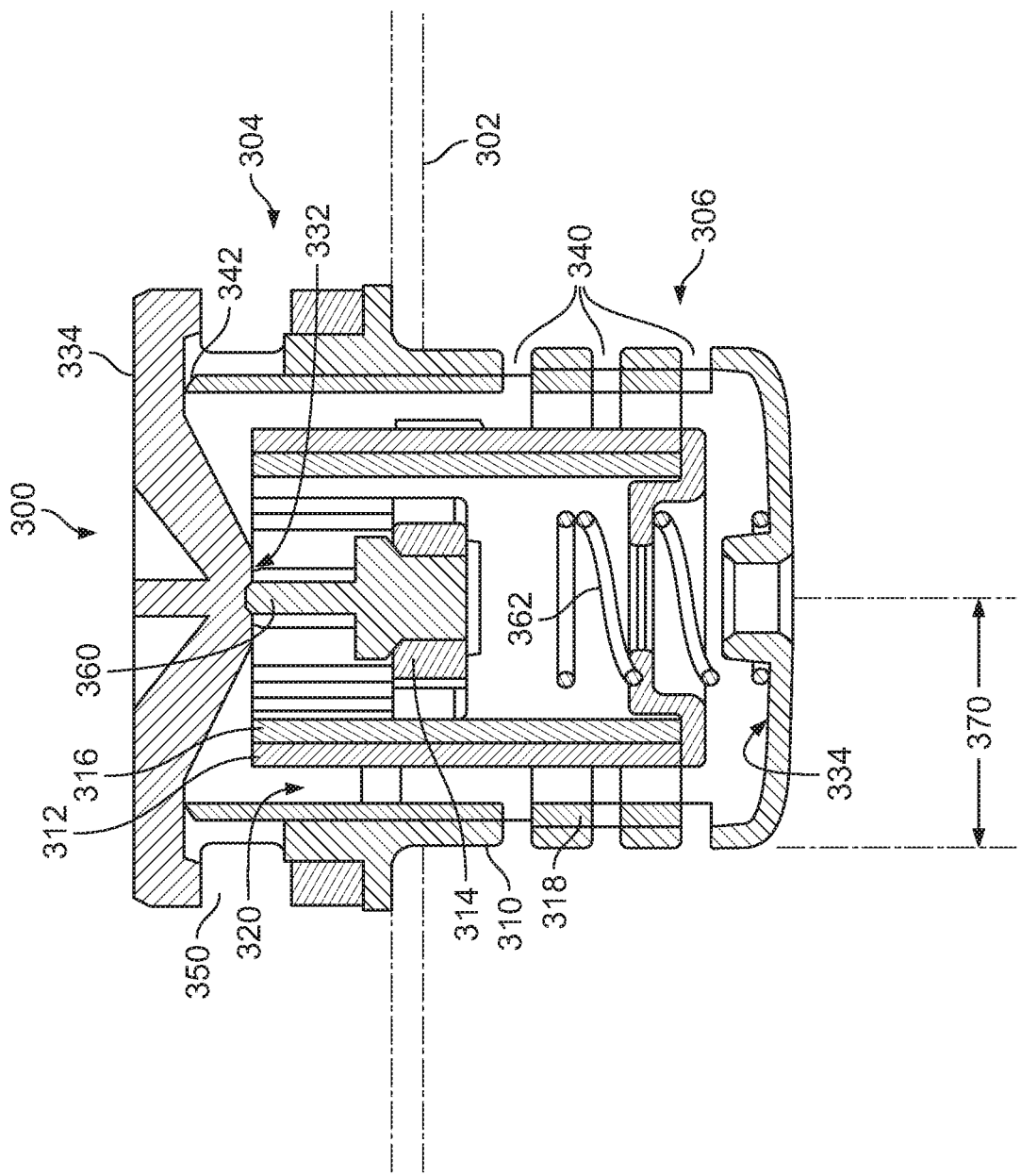
FIG. 5 is a perspective view of an exemplary apparatus according to the present disclosure in the form of a moisture pump having a differential valve in an absorbing configuration.

FIG. 4 is cutaway side view of another exemplary embodiment of the apparatus in the form of a moisture pump 300 in a desorption configuration having a differential valve area. FIG. 5 shows the moisture pump 300 in an absorption configuration. The moisture pump 300 includes a housing 310 containing a valve assembly 318. The valve assembly 318 includes a blocking member arranged adjacent to the housing 310, and any suitable linkage for mechanically connecting the blocking member to the actuator 360. Interior to the housing 310 is a chamber 320 containing a device 312 adjacent to a heat spreader 316, which is thermally connected with a heater 314. This places the heat spreader 316 in contact with both the heater 314 and device 312. An assembly of the heater 314, heat spreader 316, device 312, and valve assembly 318 are biased against an inner surface 332 of a first end 334 of the housing 310 by an actuator 360; and biased against a second end 336 of the housing by a spring 362. The actuator 360 is operable to move the valve assembly 318 inside the housing 310. As shown, the actuator 360 moves the entire assembly of the heater 314, heat spreader 316, device 312, and valve assembly 318 when it actuates; but in practice, an actuator may be mechanically coupled with few of the interior components of the moisture pump 300, e.g., with just the valve assembly 318.

The housing 310 defines one or more chambers for containing or transmitting moisture. As shown in FIGS. 4 and 5, the housing 310 defines a chamber 320. In operation, water vapor is selectively transmitted into the chamber 320 through the adsorption ports 340 and, in turn, from the chamber 320 out through the desorption port 342, shown open in FIG. 2 and closed in FIG. 3. In certain embodiments, the chamber 320 is cylindrical, and the device 312 is arranged on an outer surface of the heat spreader 316 facing outward toward the chamber 320, and toward an inner wall of the housing 310. The chamber 320 forms a void that surrounds the device 312 and provides for moisture transfer between the device 312 and air in the chamber 330. Vapor transmitted from the chamber 330 out from the desorption port 342 generally passes unobstructed through to the external environment 304 via a desorption opening 350. In certain embodiments, a small percentage of vapor may condense on surfaces inside the opening 350, which overhangs the desorption port 342 to prevent or mitigate intrusion of foreign objects and external moisture. In general, "desorption port" refers to the region where the valve assembly 318 transits to block airflow between the chamber 320 and the external environment 304. The desorption port 342 may be separated from the external environment 304 by an additional volume of air (e.g. opening 350); or may connect directly to the external environment. In optional embodiments, a membrane may cover the opening 350.

The housing 310 is formed generally in the shape of a cylinder having one or more diameters. The housing 310 optionally includes one or more openings (not shown) for housing an electrical conductor (not shown). The electrical conductor allows for the delivery of electrical power to the interior of housing 310, such as to heater 314. In certain embodiments, the valve assembly 318 and the housing 318 may both be in the form of cylinders, with the valve assembly nested inside the housing.

As described above, the heater 314 directs heat to the heat spreader 316 for heating the device 312. The heater 314 is optionally powered through an electrical conductor operatively coupled thereto, which is positioned through one or more openings of the housing 310.

In operation, the moisture pump 300 is configured to be transitioned between an adsorption configuration and a desorption configuration. FIGS. 4 and 5 show the desorption configuration, in which the valve assembly 318 is positioned in a desorption position, such that the adsorption ports 340 are blocked by the valve assembly 318, and the desorption port 342 is open between the first end 332 of the housing 310 and the valve assembly 318. This desorption position blocks airflow between the interior atmosphere 306 and the chamber 320, while allowing airflow between the chamber 320 and the exterior 304. The moisture pump 300 is generally in the desorption configuration when the heater 314 is actively heating the heat spreader 316 and device 312, such that moisture contained in the device 312 is being vaporized out and allowed to exit the moisture pump 300 through the desorption port 342.

The moisture pump 300 can be held in the desorption configuration by the actuator 360, which presses against the inner surface 332 of the first end 334 of the housing 310. In various embodiments, the actuator 360 is a thermomechanical actuator responsive to temperature. In some embodiments, the actuator 360 includes a phase change material, e.g., a phase change drive. As used herein, a phase change material expands or contracts in response to temperature such that, for example, the phase change material expands in response to being heated and contracts in response to cooling down. Non-limiting examples of phase change materials include wax (e.g., paraffin wax), bimetal elements, and Nitinol. The actuator 360 is mechanically connected with the valve assembly 318 so that, when the actuator expands and contracts, the valve assembly can move between the adsorption and desorption positions.

The moisture pump 300 can be held in the desorption configuration for a predetermined period of time, i.e., a desorption or regeneration time period sufficient for the removal of moisture from the desiccant. The desorption or regeneration time period is a comparatively fast process. Active heating of the device 312 removes moisture from the device, regenerating the device, and heating of the chamber 320 causes strong convective air currents that help transport moisture out of the moisture pump 300 relatively quickly. Due to the heat-driven convection, the desorption port 342 can have a relatively small area without impairing the ability of the moisture pump 300 to exhaust moisture. In certain embodiments, the desorption or regeneration can be achieved by heating the desiccant to a desorption temperature that is greater than or equal to 95° C. In one embodiment, the desiccant member desorbs moisture at a temperature that is greater than the boiling point of the siloxanes and/or organics in the atmosphere. The desorption temperature may range from 95° C. to 150° C., e.g., from 105° C. to 150° C., or from 110° C. to 135° C.

Once the device is sufficiently regenerated, typically after 10-30 minutes, any further time heating is wasted power and heat. Further, because the valves assembly 318 is arranged to prevent access between the inside atmosphere 306 of the protected casing 302 and the chamber 320 when in the desorption configuration, there is no moisture reduction function during the desorption (regeneration) period. Therefore, the chamber 320 may be heated for a relatively short time as compared to an adsorption time period.

FIG. 4 shows the moisture pump 300 in the desorption configuration from a side perspective (exterior) view. As shown, the valve assembly 318 is lowered to the desorption position, opening the desorption port 342, which is visible through the desorption opening 350. The adsorption ports 340 are closed by the valve assembly 318.

Figure 8:
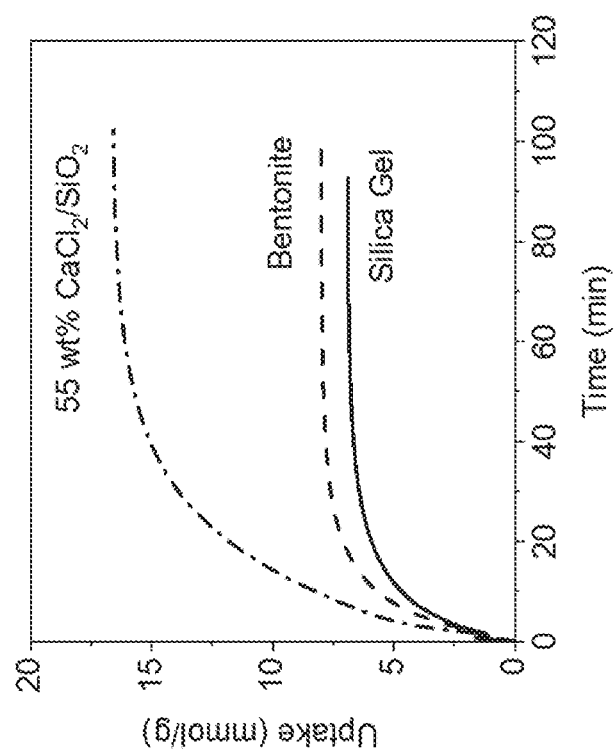
FIG. 8 depicts water vapor uptake of various desiccants at 20% relative humidity.
Figure 9:
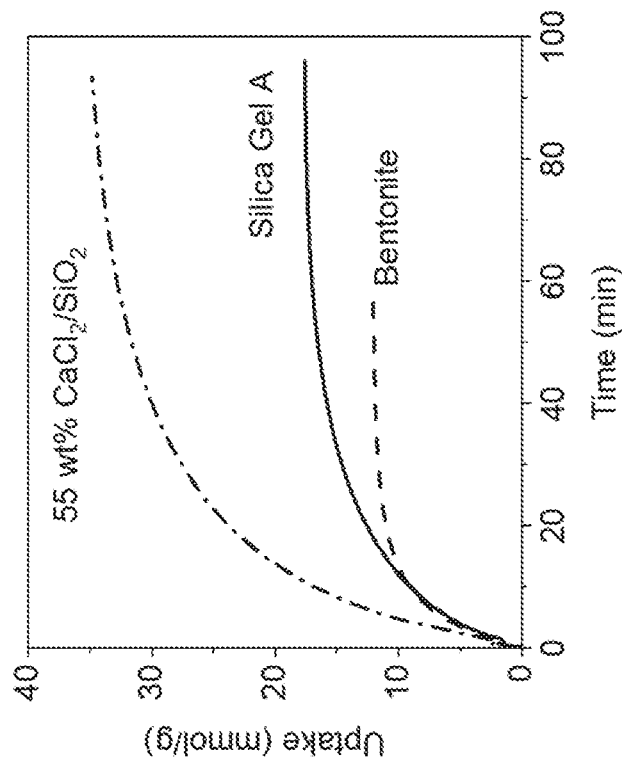
FIG. 9 depicts water vapor uptake of various desiccants at 60% relative humidity.

In one embodiment, the adsorption port 340 can have a differential valve area compared to the desorption port 342. The asymmetry of the areas of the adsorption and desorption port can provide for more rapid adsorption of moisture during an adsorption period in which the moisture pump 300 is in the adsorption configuration. The effectiveness of the desorption port at venting moisture during the desorption period is unaffected by having a smaller area. As shown in FIGS. 8-9, the adsorption port 340 includes multiple openings arranged circumferentially around the housing 310. Thus, the adsorption area can be defined by a total of the open areas of all openings that make up the adsorption port 340. For example, an adsorption area can be defined in terms of the height of each opening comprising the adsorption port 340, the circumference (which can be defined in terms of the radius 370 of the housing 310), and the number of rows of openings that comprise the adsorption port, less any supporting structure of the housing that obstructs the openings. In contrast, the desorption area is defined in terms of the desorption port 342, in which case the desorption area can be defined in terms of the height of the desorption port and the circumferences of the housing 310. In general, the height of each opening of the adsorption port 340 will be approximately equal to, or slightly less than, the height of the desorption port 342. Thus, in general, the adsorption area of the moisture pump will exceed the desorption area by a factor that is about equal to, or slightly less than, the number of parallel rows of openings that comprise the adsorption port 340. In certain embodiments, the parallel rows of openings comprising the adsorption port 340 run perpendicular to a direction of travel of the valve assembly 318, and are offset from one another in the direction of travel of the valve assembly. In one embodiment, the adsorption area can be between 800 and 1000 mm$^2$, between 700 and 1000 mm$^2$, between 600 and 1000 mm$^2$, between 500 and 1000 mm$^2$, or between 500 and 1200 mm$^2$.

In another embodiment, the valve assembly 318 may have a variable size (e.g. a stepped size at the adsorption port that is less than, or greater than, the size of the valve assembly at the desorption part). For example, in some embodiments, the moisture pump 300 may have a substantially cylindrical housing 310 at the adsorption port 340, and a substantially cylindrical housing at the desorption port 342, but have a stepped radius of the housing that differs between the adsorption and desorption ports. Under this configuration the valve assembly 318 can also have a stepped radius and be configured to nest inside the housing 310.

In the configurations shown in FIGS. 2 and 3, and in similar configurations, the adsorption area can be increased by increasing the number of rows of openings that comprise the adsorption port 340. Thus, the height and circumference of each row of openings of the adsorption port 340 do not limit the adsorption area, because additional rows of openings can be provided. In contrast, moisture pumps that employ a single adsorption port must provide sufficient travel of an adsorption valve to provide sufficient adsorption area; or must provide a larger radius of the adsorption valve. Thus, the configurations shown in FIGS. 2 and 3 can provide adequate adsorption area with smaller travel than conventional moisture pumps, and in a device with a smaller footprint. By way of example, in some embodiments, sufficient adsorptive efficiency can be provided in a moisture pump with a radius of 20 mm or less, e.g., 25 mm or less, or 30 mm or less. In certain embodiments, three or more rows of openings may be provided in the adsorption port 340, each of which may have individual heights of 3 mm or less, e.g., 3.5 mm or less, or 4.0 mm or less. In certain embodiments, the height of the adsorption port 340 may vary from row to row and in other embodiments, the adsorption ports 340 in each row has the same height. The height of the desorption port 342 may be 3 mm or less, e.g., 3.5 mm or less, 4.0 mm or less, or 5.0 mm or less. Due to the number of rows the total height of the adsorption ports 340 provides a differential valve area compared to the area the desorption port 342. The total height of the adsorption port is greater than the height of the desorption port, e.g., at least twice as large or at least three times as large. In some embodiments, more than three rows of openings may be provided in the adsorption port 340, depending on the application and on the depth to which the moisture pump 300 is permitted to penetrate the interior of casing 302. For example, in applications requiring low adsorption rates, the adsorption port 340 can comprise two or three rows of openings. In applications requiring greater adsorption rates, the adsorption port 340 can comprise three or more rows of openings. In certain embodiments, the height of the desorption port 342 can be equal to a distance that the valve assembly 318 is permitted to travel (i.e. the valve travel). The heights of individual windows making up the adsorption port 340 can also be equal to, or less than, the valve travel. In some embodiments, the windows of the adsorption port may be slightly narrower than the distance of the valve travel to ensure that air cannot pass around the valve assembly at the adsorption port when the adsorption port is closed.

The configuration of the adsorption port 340 can also affect the efficiency of the adsorption process by providing a shortened path for airflow and/or moisture diffusion from the inside atmosphere 306 to encounter the device 312. In certain embodiments, and as shown in FIGS. 2 and 3, the adsorption port 340 comprises multiple rows of openings that are positioned around and encompassing at least part of the device 312 across a region of the chamber 320. In this and similar arrangements, the air from the inside atmosphere 306 can readily pass through the adsorption port 340 at many points around the circumference of the housing 310, and readily encounter the device 31 without having to traverse the chamber 320. This arrangement contrasts with moisture pumps that have a singular adsorption port at one side or end, in which case, air entering the moisture pump would first encounter only a small part of the desiccant.

The device 312, heater 314, and heat spreader 316 are shown positioned in or maintained in the chamber 320. The device 31 is exposed to the moisture in the air of chamber 320. In other embodiments (not shown), device 312, heater 314, and heat spreader 316 may be partially positioned in the chamber 320. In yet other embodiments (not shown), the heater 314 may be positioned outside of the chamber 320 and the heat spreader 316 is position in or partially positioned in the chamber 320. Embodiments described above refer primarily to a substantially cylindrical moisture pump 300, however, it will be understood that the principles herein described may be applied with reference to any other suitable shape where a valve assembly 318 can be slidingly positioned within a housing 310. In various alternative embodiments, the housing 310 and associated valve assembly 318 can have an elliptical cross section, rectangular cross section, or any other suitable cross section. As discussed above, various alternative embodiments may also employ stepped cross-sectional areas.

Embodiments shown in FIGS. 2 and 3 are operable without a second chamber, e.g., condensation chamber, and air can flow directly into the exterior environment 306 from the chamber 320 when the moisture pump 300 is in the desorbing configuration. In other embodiments, a condensation chamber may be included. As described above when a condensation chamber is used there may be a vent port and a membrane covering the vent port. The venting port provides an opening for water vapor transmission out of the condensation chamber and to, for example, the outside environment. The vent port is operable to prevent intrusion of some substances into the moisture pump, e.g. debris, liquid water, oils, and/or other substances. Water vapor collects in the condensation chamber during desorption and exits the venting port out of the condensation chamber. In certain embodiments at least a portion of the water vapor precipitates inside the condensation chamber before being transmitted out of the condensation chamber. For example, condensed liquid water can evaporate over time into the air of the condensation chamber while the desorption port is closed (i.e. in the adsorption configuration) and subsequently pass through the venting port or out of a drain portion (not shown). In certain embodiments, the membrane or membranes making up the venting port can be water vapor permeable but impermeable to debris and liquid water, so as to prevent intrusion or debris or liquid water from the outside environment into the moisture pump. One or more membranes may also be present covering the adsorption ports (not shown), e.g. to prevent particles freed from the desiccant from entering the inside environment.

Additional non-limiting examples of apparatuses within the scope of the present disclosure are described in further detail in U.S. Pat. No. 10,156,372 and WIPO Publication No. WO/2019010433 which are both incorporated by reference herein in their entireties.

In some embodiments, one or more contaminants and water vapor can be within an internal volume of the enclosure. In some embodiments, the one or more contaminants comprises one or more of: one or more siloxanes, one or more aliphatic alcohols, one or more aromatic alcohols, one or more nitrogen containing compounds, or one or more other organic compounds.

In some embodiments, the one or more contaminants comprises one or more of: one or more siloxanes, one or more aliphatic alcohols, one or more aromatic alcohols, one or more nitrogen containing compounds, or one or more other organic compounds.

In some embodiments, the one or more siloxanes comprises one or more of: hexamethylcyclotrisiloxane, octamethylcyclotetrasiloxane, decamethylcyclopentasiloxane, dodecamethylcyclohexasiloxane, tetradecamethylcycloheptasiloxane, hexamethyldisiloxane, octamethyltrisiloxane, decamethyltetrasiloxane, or dodecamethylpentasiloxane.

In some embodiments, the one or more aliphatic alcohols comprises one or more of: 2-ethyl-hexanol or dodecanol.

In some embodiments, the one or more aromatic alcohols comprises one or more of: benzyl alcohol or 2,4-di-tert-butylphenol.

In some embodiments, the one or more nitrogen containing compounds comprises one or more of N-methyl-2-pyrrolidone, dibutylamine, dibutylformamide, or caprolactam.

In some embodiments, the one or more other organic compounds comprises one or more of: toluene, xylene, benzene, isopropyl benzene, trimethyl benzene, tetramethylbenzene, naphthalene, caprolactam, 1-hydroxycyclohexyl phenyl ketone, acetophenone, benzaldehyde, heptanal, hexanal, octahydro-4,7-methano-1H-indene, dipropylene glycol, diethylene glycol, diacetylbenzene, butanediol adipate, diphenyl sulfone, propylene carbonate, or tetradecane.

In some embodiments, the enclosure comprises a sufficient amount of water vapor to provide a relative humidity of from 15% to 60%. In some embodiments, the enclosure comprises a sufficient amount of water vapor to provide a relative humidity of from 20% to 55%. relative humidity of from 25% to 50%. In some embodiments, the enclosure comprises a sufficient amount of water vapor to provide a relative humidity of from 30% to 45%. In some embodiments, the enclosure comprises a sufficient amount of water vapor to provide a relative humidity of from 35% to 40%.

In some embodiments, a device can be positioned at least partially within the enclosure. In some embodiments, the device can be fully within the enclosure. In some embodiments, the device can be partially within the enclosure. Alternatively, in some embodiments, the device can be positioned outside of the enclosure, yet sufficiently close to the enclosure to allow moisture to travel between the device and the internal volume of the enclosure, so as to absorb water vapor within the internal volume of the enclosure. In some embodiments, the device is in contact with the enclosure. In some embodiments, the device is attached to an outer surface of the enclosure.

In some embodiments, the enclosure is comprised of at least one corrodible metal. In some embodiments, the corrodible metal comprises one or more of: stainless steel, copper, or aluminum. In some embodiments, the stainless steel is 304 stainless steel. In some embodiments, the copper is C122 copper. In some embodiments, the aluminum is 6061 aluminum.

In some embodiments, the device is in fluid communication with the enclosure so as to allow moisture to travel between the device and the enclosure. In some embodiments, there is a conduit allowing for moisture transmission between the device and the enclosure. This conduit can take the form of a tube, a pipe, a valve, or any other suitable conduit known to those skilled in the art. The length of the conduit should correspond to the distance between the device and the enclosure, as described herein.

In some embodiments, the device comprises a substrate loaded with a desiccant. In some embodiments, 50 to 90 wt % of the substrate is loaded with the desiccant. In some embodiments, 55 to 85 wt % of the substrate is loaded with the desiccant. In some embodiments, 60 to 80 wt % of the substrate is loaded with the desiccant. In some embodiments, 65 to 75 wt % of the substrate is loaded with the desiccant. In some embodiments, 65 to 70 wt % of the substrate is loaded with the desiccant.

In some embodiments, 50 to 85 wt % of the substrate is loaded with the desiccant. In some embodiments, 50 to 80 wt % of the substrate is loaded with the desiccant. In some embodiments, 50 to 75 wt % of the substrate is loaded with the desiccant. In some embodiments, the device comprises a substrate loaded with a desiccant. In some embodiments, 50 to 70 wt % of the substrate is loaded with the desiccant. In some embodiments, 50 to 65 wt % of the substrate is loaded with the desiccant. In some embodiments, 50 to 60 wt % of the substrate is loaded with the desiccant. In some embodiments, 50 to 55 wt % of the substrate is loaded with the desiccant.

In some embodiments, 55 to 90 wt % of the substrate is loaded with the desiccant. In some embodiments, 60 to 90 wt % of the substrate is loaded with the desiccant. In some embodiments, 65 to 90 wt % of the substrate is loaded with the desiccant. In some embodiments, 70 to 90 wt % of the substrate is loaded with the desiccant. In some embodiments, 80 to 90 wt % of the substrate is loaded with the desiccant. In some embodiments, 85 to 90 wt % of the substrate is loaded with the desiccant.

In some embodiments, the substrate comprises at least one polymer material. In some embodiments, the at least one polymer material comprises a fluoropolymer. In some embodiments, the at least one polymer material comprises an expanded fluoropolymer.

In some embodiments, the at least one polymer material of the substrate comprises polytetrafluoroethylene (PTFE).

In some embodiments, the at least one polymer material of the substrate comprises expanded polytetrafluoroethylene (ePTFE).

In some embodiments, the substrate can have a thickness ranging from 0.1 to 15 mm. In some embodiments, the substrate can have a thickness ranging from 0.2 to 10 mm. In some embodiments, the substrate can have a thickness ranging from 0.4 to 5 mm. In some embodiments, the substrate can have a thickness ranging from 0.75 to 2.5 mm. In some embodiments, the substrate can have a thickness ranging from 1.5 to 2 mm.

In some embodiments, the at least one polymer material comprises poly(ethylene-cotetrafluoroethylene) (ETFE), ultrahigh molecular weight polyethylene (UHMWPE), polyparaxylylene (PPX), polylactic acid, and any combination or blend thereof.

In some embodiments, the substrate is in the form of a tape. In some embodiments, the tape is a diced tape. In some embodiments, the substrate is in the form of a tube. In some embodiments, the substrate is in the form of a disc.

In some embodiments, the substrate comprises at least one additional polymer material. In some embodiments, the at least one additional polymer material comprises at least one polymer membrane positioned on at least one side of the substrate. In some embodiments, the at least one additional polymer material comprises a plurality of polymer membranes positioned on multiple sides of the substrate.

In some embodiments, the at least one additional polymer material is configured to decrease the transfer of desiccant particles from the device into the enclosure from 50% to 97% relative to a device with only a single polymer material. In some embodiments, the at least one additional polymer material is configured to decrease the transfer of desiccant particles from the device into the enclosure from 60% to 87% relative to a device with only a single polymer material. In some embodiments, the at least one additional polymer material is configured to decrease the transfer of desiccant particles from the device into the enclosure from 70% to 77% relative to a device with only a single polymer material.

In some embodiments, the at least one additional polymer material functions as a barrier to prevent desiccant particles from entering into the enclosure. In embodiments where the enclosure comprises at least one corrodible metal, preventing desiccant particles from entering into the enclosure can reduce corrosion. In some embodiments, including at least one additional polymer material in the device can reduce corrosion of the at least one corrodible metal to from 20% to 86% less than a device comprising only a single polymer material. In some embodiments, including at least one additional polymer material in the device can reduce corrosion of the at least one corrodible metal to from 40% to 72% less than a device comprising only a single polymer material. In some embodiments, including at least one additional polymer material in the device can reduce corrosion of the at least one corrodible metal to from 42% to 60% less than a device comprising only a single polymer material.

In some embodiments, the desiccant comprises calcium chloride salt and a support material partially impregnated with the calcium chloride salt. In some embodiments, 20 wt % to 70 wt % of the support material is impregnated with the calcium chloride salt. In some embodiments, 25 wt % to 65 wt % of the support material is impregnated with the calcium chloride salt. In some embodiments, 30 wt % to 60 wt % of the support material is impregnated with the calcium chloride salt. In some embodiments, 35 wt % to 55 wt % of the support material is impregnated with the calcium chloride salt. In some embodiments, 40 wt % to 50 wt % of the support material is impregnated with the calcium chloride salt.

In some embodiments, 20 wt % to 65 wt % of the support material is impregnated with the calcium chloride salt. In some embodiments, 20 wt % to 60 wt % of the support material is impregnated with the calcium chloride salt. In some embodiments, 20 wt % to 55 wt % of the support material is impregnated with the calcium chloride salt. In some embodiments, 20 wt % to 50 wt % of the support material is impregnated with the calcium chloride salt. In some embodiments, 20 wt % to 45 wt % of the support material is impregnated with the calcium chloride salt. In some embodiments, 20 wt % to 40 wt % of the support material is impregnated with the calcium chloride salt. In some embodiments, 20 wt % to 35 wt % of the support material is impregnated with the calcium chloride salt. In some embodiments, 20 wt % to 30 wt % of the support material is impregnated with the calcium chloride salt.

In some embodiments, 25 wt % to 70 wt % of the support material is impregnated with the calcium chloride salt. In some embodiments, 30 wt % to 70 wt % of the support material is impregnated with the calcium chloride salt. In some embodiments, 35 wt % to 70 wt % of the support material is impregnated with the calcium chloride salt. In some embodiments, 40 wt % to 70 wt % of the support material is impregnated with the calcium chloride salt. In some embodiments, 45 wt % to 70 wt % of the support material is impregnated with the calcium chloride salt. In some embodiments, 50 wt % to 70 wt % of the support material is impregnated with the calcium chloride salt. In some embodiments, 60 wt % to 70 wt % of the support material is impregnated with the calcium chloride salt. In some embodiments, 65 wt % to 70 wt % of the support material is impregnated with the calcium chloride salt.

In some embodiments, the support material has a pore volume ranging from 0.2 to 2.1 $cm^3/g$. In some embodiments, the support material has a pore volume ranging from 0.4 to 1.9 $cm^3/g$. In some embodiments, the support material has a pore volume ranging from 0.6 to 1.7 $cm^3/g$. In some embodiments, the support material has a pore volume ranging from 0.8 to 1.5 $cm^3/g$. In some embodiments, the support material has a pore volume ranging from 1.0 to 1.3 $cm^3/g$. In some embodiments, the support material has a pore volume ranging from 1.1 to 1.2 $cm^3/g$.

In some embodiments, the support material has a surface area ranging from 273 to 1534 $m^2/g$. In some embodiments, the support material has a surface area ranging from 573 to 1334 $m^2/g$. In some embodiments, the support material has a surface area ranging from 773 to 1134 $m^2/g$. In some embodiments, the support material has a surface area ranging from 873 to 1034 $m^2/g$.

In some embodiments, the support material is comprised of a metal oxide. In some embodiments, the metal oxide comprises one or more of aluminum oxide or silicon dioxide. In some embodiments, the support material comprises activated carbon. In some embodiments, the support material comprises a metal organic framework. In some embodiments, the metal organic framework is UiO-66.

It has been unexpectedly discovered that the device described herein exhibits improved water vapor capacity when disposed at least partially within or proximal to (i.e., at the distances described herein) an enclosure containing one or more of the contaminants described herein. Thus, in some embodiments, there is provided a sufficient amount of at least one of: the desiccant or the substrate to impart unto the device, a water vapor capacity that does not decrease by more than 17% after undergoing up to 384 adsorption/desorption cycles. In some embodiments, there is provided a sufficient amount of at least one of: the desiccant or the substrate to impart unto the device, a water vapor capacity that does not decrease by more than 9% after undergoing up to 192 adsorption/desorption cycles. In some embodiments, there is provided a sufficient amount of at least one of: the desiccant or the substrate to impart unto the device, a water vapor capacity that does not decrease by more than 5% after undergoing up to 96 adsorption/desorption cycles. In some embodiments, there is provided a sufficient amount of at least one of: the desiccant or the substrate to impart unto the device, a water vapor capacity that does not decrease by more than 2% after undergoing up to 48 adsorption/desorption cycles. In some embodiments, there is provided a sufficient amount of at least one of: the desiccant or the substrate to impart unto the device, a water vapor capacity that does not decrease by more than 1% after undergoing up to 24 adsorption/desorption cycles. In some embodiments, there is provided a sufficient amount of at least one of: the desiccant or the substrate to impart unto the device, a water vapor capacity that does not decrease by more than 0.5% after undergoing up to 12 adsorption/desorption cycles. In some embodiments, there is provided a sufficient amount of at least one of: the desiccant or the substrate to impart unto the device, a water vapor capacity that does not decrease by more than 0.25% after undergoing up to 6 adsorption/desorption cycles.

In some embodiments, the absorption/desorption of one or both of: the desiccant or the substrate is configured to be driven by a temperature gradient between the device and a heat source. In some embodiments, the absorption/desorption of one or both of: the desiccant or the substrate is configured to be driven by a temperature gradient between the device and a heat source. In some embodiments, the heat source takes the form of a heater. In some embodiments, the heater is a positive thermal coefficient (PTC) heater as described in U.S. Pat. No. 10,156,372 and WIPO Publication No. WO/2019010433. In some embodiments, the absorption/desorption of the desiccant is configured to be driven by a moisture gradient between the enclosure and the device.

In some embodiments, each absorption/desorption cycle is a thermal cycle. In some embodiments, each thermal cycle comprises repeatedly heating and cooling the desiccant between temperatures ranging from −20° C. to 150° C. In some embodiments, each thermal cycle comprises repeatedly heating and cooling the desiccant between temperatures ranging from −20° C. to 125° C. In some embodiments, each thermal cycle comprises repeatedly heating and cooling the desiccant between temperatures ranging from −20° C. to 100° C. In some embodiments, each thermal cycle comprises repeatedly heating and cooling the desiccant between temperatures ranging from −20° C. to 75° C. In some embodiments, each thermal cycle comprises repeatedly heating and cooling the desiccant between temperatures ranging from −20° C. to 50° C. In some embodiments, each thermal cycle comprises repeatedly heating and cooling the desiccant between temperatures ranging from −20° C. to 25° C. In some embodiments, each thermal cycle comprises repeatedly heating and cooling the desiccant between temperatures ranging from −20° C. to 0° C.

In some embodiments, each thermal cycle comprises repeatedly heating and cooling the desiccant between temperatures ranging from 0° C. to 150° C. In some embodiments, each thermal cycle comprises repeatedly heating and cooling the desiccant between temperatures ranging from 25° C. to 150° C. In some embodiments, each thermal cycle comprises repeatedly heating and cooling the desiccant between temperatures ranging from 50° C. to 150° C. In some embodiments, each thermal cycle comprises repeatedly heating and cooling the desiccant between temperatures ranging from 75° C. to 150° C. In some embodiments, each thermal cycle comprises repeatedly heating and cooling the desiccant between temperatures ranging from 100° C. to 150° C. In some embodiments, each thermal cycle comprises repeatedly heating and cooling the desiccant between temperatures ranging from 125° C. to 150° C.

In some embodiments, each thermal cycle comprises repeatedly heating and cooling the desiccant between temperatures ranging from 25° C. to 125° C. In some embodiments, each thermal cycle comprises repeatedly heating and cooling the desiccant between temperatures ranging from 50° C. to 100° C. In some embodiments, each thermal cycle comprises repeatedly heating and cooling the desiccant between temperatures ranging from 75° C. to 100° C.

In some embodiments, each absorption/desorption cycle is a moisture cycle. The moisture cycles described herein may (but need not) be performed by any of the moisture pumps described herein.

In some embodiments, each absorption/desorption cycle is a moisture cycle, during which the desiccant is exposed to air having a certain relative humidity so as to create a moisture gradient between the desiccant and the air.

In some embodiments, the relative humidity of the air ranges from 20% to 95%. In some embodiments, the relative humidity of the air ranges from 20% to 75%. In some embodiments, the relative humidity of the air ranges from 20% to 50%. In some embodiments, the relative humidity of the air ranges from 20% to 25%.

In some embodiments, the relative humidity of the air ranges from 25% to 95%. In some embodiments, the relative humidity of the air ranges from 50% to 95%. In some embodiments, the relative humidity of the air ranges from 75% to 95%. In some embodiments, the relative humidity of the air ranges from 90% to 95%.

In some embodiments, the relative humidity of the air ranges from 20% to 95%. In some embodiments, the relative humidity of the air ranges from 25% to 75%. In some embodiments, the relative humidity of the air ranges from 40% to 60%. In some embodiments, the relative humidity of the air ranges from 50% to 55%.

EXAMPLES

Example 1: Textural Properties of Desiccants

Textural properties of various desiccants were measured using nitrogen physisorption performed at 77 K using a Quantachrome Autosorb iQ instrument. The samples were degassed under vacuum at 125° C. for 4 hours prior to analysis. The results are shown in Table 1. The surface area and pore volume of 3A molecular sieve are not attainable due to the exclusion of nitrogen molecules. Silica SY290 displays a high pore volume of 1.86 cm$^3$/g, while silica gel has the highest surface area of 741 m$^2$/g.

TABLE 1

Textural properties of various desiccants

| Sample | BET Surface Area (m$^2$/g) | Pore Volume (cm$^3$/g) |
|---|---|---|
| Silica SY290 | 282 | 1.86 |
| Silica Gel | 741 | 0.44 |

TABLE 1-continued

Textural properties of various desiccants

| Sample | BET Surface Area (m$^2$/g) | Pore Volume (cm$^3$/g) |
|---|---|---|
| Bentonite Clay | 57 | 0.15 |
| 3A Molecular Sieve | — | — |

Example 2: Wet Impregnation of Calcium Chloride in Silica Support

Wet impregnation was performed by mixing 1 g of silica SY290 and 0.55 g of calcium chloride. The salt was dried in an oven at 150° C. for 2 hours prior to weighing. Subsequently, a small amount of water (<4 cm$^3$) was added to the mixture and stirred evenly. The slurry was dried in an oven at 110° C. for several hours to obtain a dry sample. It was found that a silica support with high pore volume (>1.50 cm$^3$/g) is able to accommodate a high loading of CaCl$_2$) (>50 wt %).

Example 3: Adsorption Isotherms of Water Vapor Uptake

Figure 6:
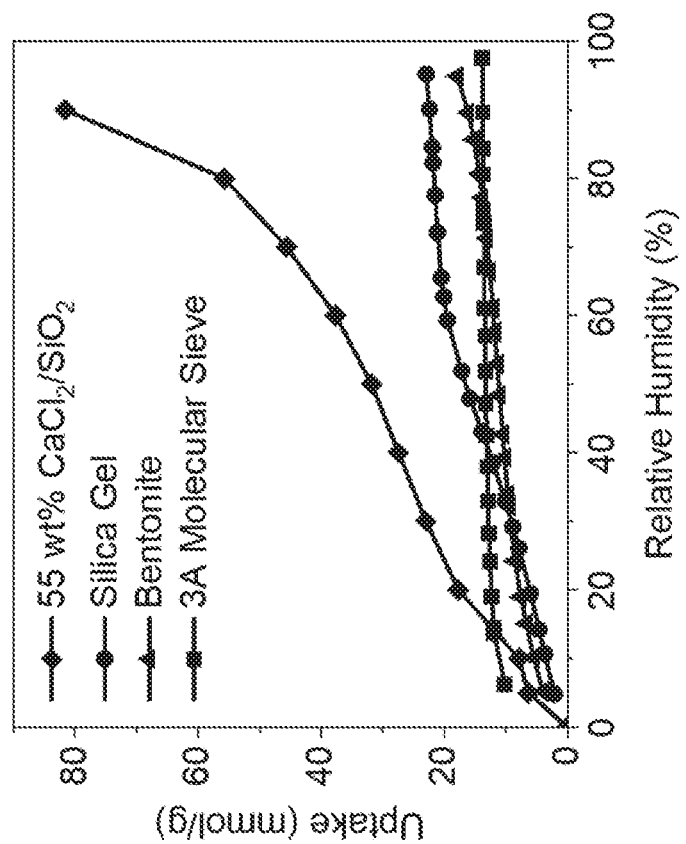
FIG. 6 depicts water vapor uptake of various desiccants at 25° C.

Water vapor uptake of the desiccants were measured using a Quantachrome Vstar instrument at 25° C. The samples were degassed under vacuum at 125° C. for 4 hours prior to water vapor adsorption. FIG. 6 shows the adsorption isotherms of 55 wt % CaCl$_2$/SiO$_2$, Silica Gel, Bentonite Clay, and 3A Molecular Sieve. The silica supported calcium chloride desiccant has a higher uptake compared to the other desiccants above 15% relative humidity.

TABLE 1

Water vapor uptake (mmol/g) of various desiccants at 25° C.

| RH (%) | 55 wt % CaCl$_2$/ SiO$_2$ | Silica Gel | Bentonite | 3A Mol Sieve |
|---|---|---|---|---|
| 5 | 6.4 | 2.2 | 3.9 | 10.1 |
| 10 | 7.9 | 3.5 | 5.5 | 11.4 |
| 20 | 17.7 | 6.1 | 7.8 | 12.4 |
| 40 | 27.5 | 12.8 | 10.3 | 13.1 |
| 60 | 37.6 | 19.4 | 12.0 | 13.4 |
| 80 | 55.7 | 21.7 | 14.2 | 13.7 |
| 90 | 81.6 | 22.2 | 16.3 | 13.8 |

Example 4: Regeneration of Desiccants by Heat

Figure 7:
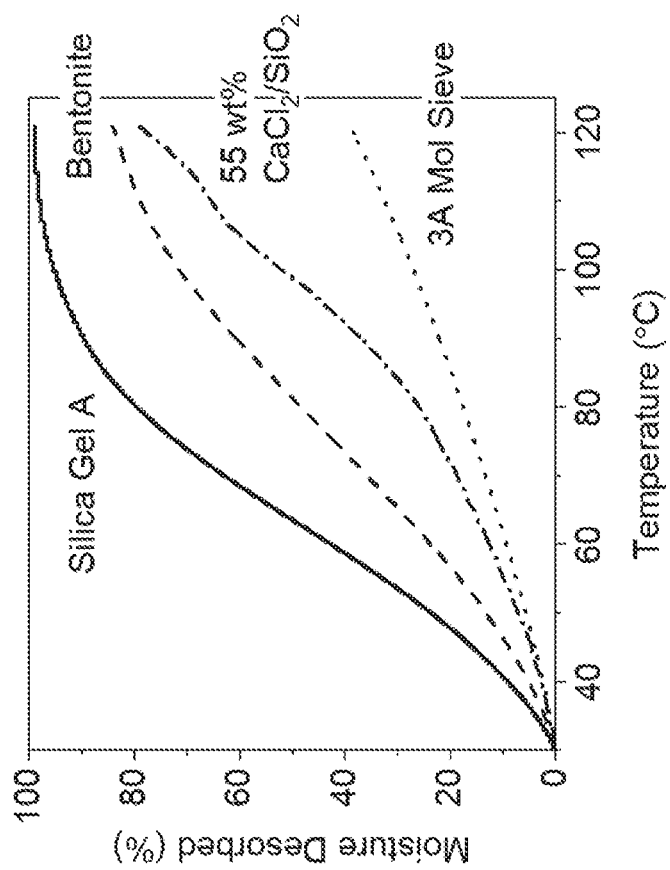
FIG. 7 depicts percentages of moisture desorbed from various desiccants during regeneration by heat.

The desiccants can be regenerated by heat in a heated moisture pump (HMP) device and the amount of water vapor desorbed can be measured as a function of temperature. Initially, the powder desiccants were exposed to atmospheric water vapor for several hours. The samples were then heated to 125° C. at a ramp rate of 10° C./min and held for 4 hours using a thermogravimetric analyzer (TA Instruments TGA 5500). FIG. 7 shows the percentage of moisture desorbed from the desiccants as a function of temperature.

Silica gel lost most of its moisture by 120° C., while bentonite clay and 55 wt % CaCl$_2$/SiO$_2$ lost approximately 80% of absorbed water vapor. However, 3A molecular sieve only lost 40% of its moisture, and the rest is desorbed while the temperature was held at 125° C. for 4 hours. The result shows that the amount of heat energy required to regenerate the silica supported calcium chloride desiccant is comparable to that of bentonite clay.

Example 5. Water Vapor Adsorption Kinetics of Desiccants

To determine the adsorption kinetics of water vapor, the Dynamic Vapor Sorption (DVS) instrument was used. The samples were initially degassed under vacuum at 125° C. for 4 hours and then cooled down to 25° C. Subsequently, the samples were exposed to 20 or 60% relative humidity of water vapor. The uptake of water vapor was stopped when the differential mass decreased to less than 0.05.

FIG. 8 and FIG. 9 show the uptake of water vapor by the desiccants at 20 and 60% relative humidity, respectively. The silica supported calcium chloride desiccant is able to reach full capacity within the same time as silica gel. Furthermore, the uptake of the $CaCl_2$ desiccant is significantly higher compared to both silica gel and bentonite clay under these conditions.

Example 6. Effect of Contamination on Water Vapor Uptake of $CaCl_2$/$SiO_2$

Figure 10:
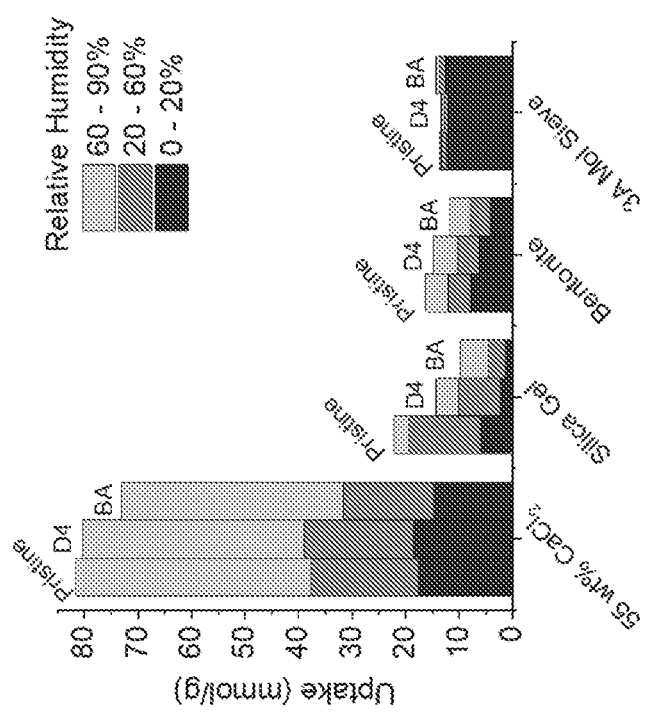
FIGS. 10-12 depict water vapor uptake of desiccants before and after exposure to contaminants.

The presence of contaminants in the target environment of the HMP device can decrease the water vapor uptake of the desiccants. Two of the main contaminants found in solar inverters are octamethycyclotetrasiloxane (D4) and benzyl alcohol (BA). To test the effect of contamination on water vapor uptake, the fresh desiccants were exposed to D4 and BA separately, and the water vapor uptake was measured using the procedure from Example 3. The exposure was performed in a closed desiccant box. The fresh desiccants and a vial of liquid D4 or BA (20 mL) were placed in the desiccant box, which was thermally cycled in an oven for 20 times between 40 and 125° C. The results are shown in FIG. 10.

$CaCl_2$/$SiO_2$ only shows a small decrease in uptake after exposure to contaminants, and still significantly higher compared to silica gel, bentonite clay, and 3A molecular sieve.

TABLE 2

Water vapor uptake of desiccants (mmol/g) before and after exposure to contaminants

| Desiccant | Pristine | | | After Exposure to D4 | | | After Exposure to BA | | |
| --- | --- | --- | --- | --- | --- | --- | --- | --- | --- |
| | 20% RH | 60% RH | 90% RH | 20% RH | 60% RH | 90% RH | 20% RH | 60% RH | 90% RH |
| 55 wt % $CaCl_2$/$SiO_2$ | 17.7 | 37.6 | 81.6 | 18.6 | 39.0 | 80.4 | 14.7 | 31.6 | 73.2 |
| Silica Gel | 6.1 | 19.4 | 22.2 | 2.3 | 10.0 | 14.4 | 1.3 | 4.6 | 9.8 |
| Bentonite | 7.8 | 12.0 | 16.3 | 6.1 | 10.3 | 14.8 | 4.3 | 7.8 | 11.8 |
| 3A Mol Sieve | 12.4 | 13.4 | 13.8 | 12.1 | 13.0 | 13.4 | 12.6 | 13.6 | 14.4 |

Example 7. Effect of Contamination on Water Vapor Uptake of Supported $CaCl_2$ Desiccants The impregnation of $CaCl_2$ can be extended to other porous supports, such as metal-organic framework (UiO-66), activated carbon (SA20), and metal oxide (aluminum oxide). The impregnation method is similar to Example 2, but the salt content is reduced due to lower pore volume of these supports (20 wt % $CaCl_2$/UiO-66, 30 wt % $CaCl_2$/SA20, 20 wt % $CaCl_2$/$Al_2O_3$).

Figure 11:
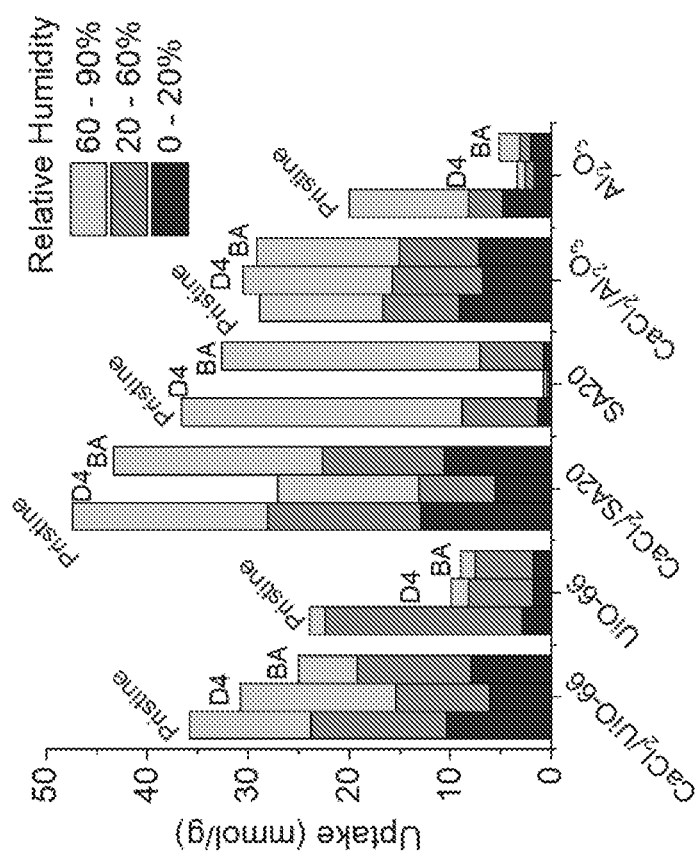

The effect of contamination on water vapor uptake of these desiccants was also investigated using the same method in Example 6, and the results are shown in FIG. 11. In general, the calcium chloride containing desiccants show higher water vapor uptake and greater resistance against contamination compared to its respective support.

Figure 12:
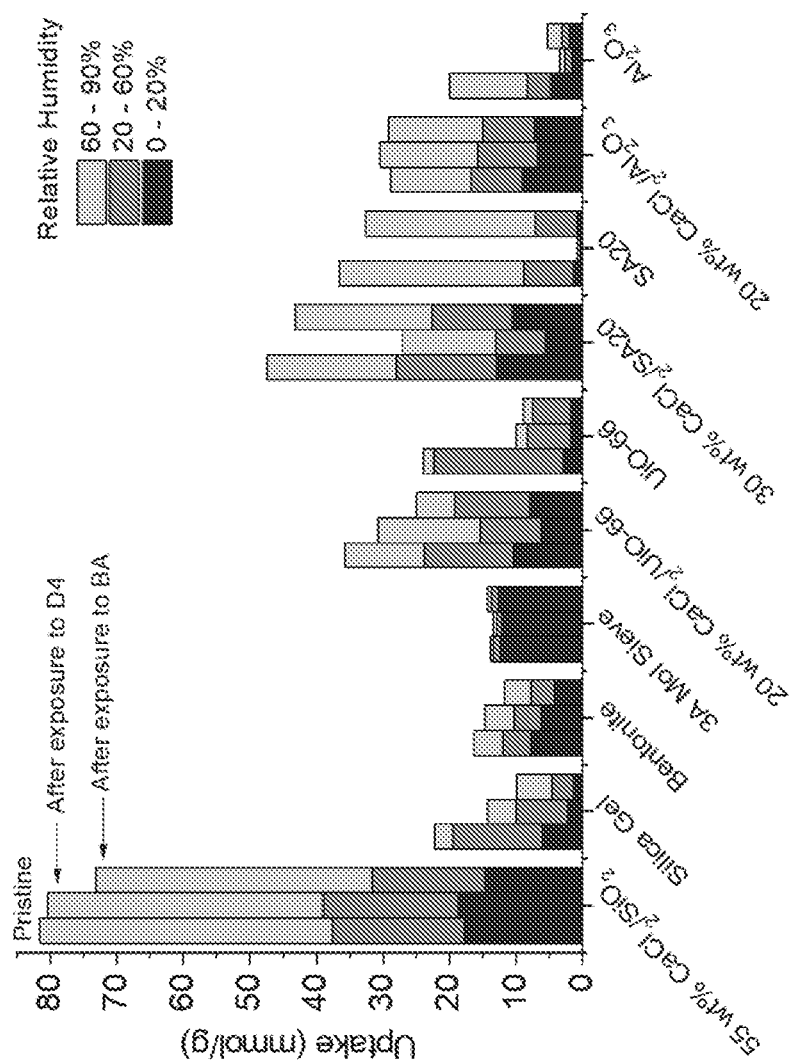

A combination of the results of FIG. 10 and FIG. 11 is shown in FIG. 12 and generally shows that calcium chloride containing desiccants show higher water vapor uptake and greater resistance against contamination when compared to various other desiccants described herein—supported or otherwise.

TABLE 3

Water vapor uptake (mmol/g) of various supported calcium chloride desiccants before and after exposure to contaminants

| | Pristine | | | After Exposure to D4 | | | After Exposure to BA | | |
|---|---|---|---|---|---|---|---|---|---|
| Desiccant | 20% RH | 60% RH | 90% RH | 20% RH | 60% RH | 90% RH | 20% RH | 60% RH | 90% RH |
| 20 wt % $CaCl_2$/UiO-66 | 10.4 | 23.8 | 35.8 | 6.2 | 15.4 | 30.8 | 7.9 | 19.2 | 25.0 |
| UiO-66 | 2.9 | 22.4 | 23.9 | 1.8 | 8.2 | 10.0 | 1.8 | 7.6 | 9.0 |
| 30 wt % $CaCl_2$/SA20 | 12.9 | 28.1 | 47.4 | 5.6 | 13.1 | 27.1 | 10.5 | 22.7 | 43.3 |
| SA20 | 1.4 | 8.8 | 36.6 | 0.2 | 0.4 | 0.8 | 0.8 | 7.1 | 32.6 |
| 20 wt % $CaCl_2$/$Al_2O_3$ | 9.1 | 16.6 | 28.9 | 6.7 | 15.8 | 30.5 | 7.2 | 15.1 | 29.1 |
| $Al_2O_3$ | 4.7 | 8.2 | 20.0 | 1.6 | 2.6 | 3.4 | 2.0 | 3.1 | 5.2 |

Example 8: Fabrication of Unsupported $CaCl_2$/$SiO_2$ and PTFE Composite Tape Approximately 150 g of silica supported calcium chloride and 37.5 g of polytetrafluoroethylene (PTFE) were evenly mixed to give a composition of 80% $CaCl_2$/$SiO_2$ desiccant and 20% PTFE.

Figure 13:
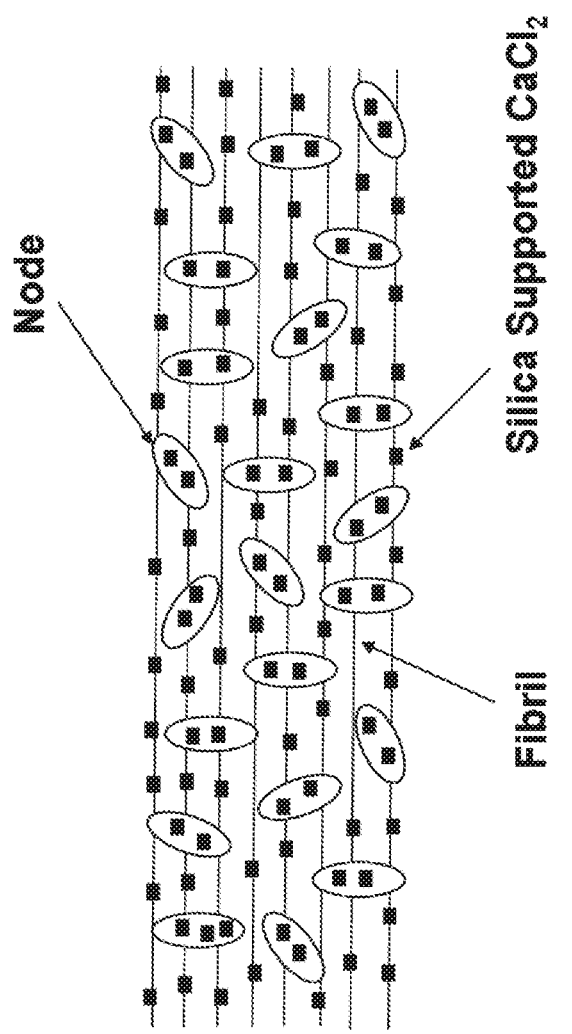
FIG. 13 is a schematic drawing of a porous fibrillated polymer tape.

A porous fibrillated polymer tape shown in FIG. 13 is formed by blending the mixture in a manner such as is generally taught in United States Publication No. 2005/0057888 to Mitchell et al. Besides using silica supported calcium chloride, other desiccants such as silica gel, bentonite clay, and 3A molecular sieve can also be used as filler in the polymer tape.

Figure 14:
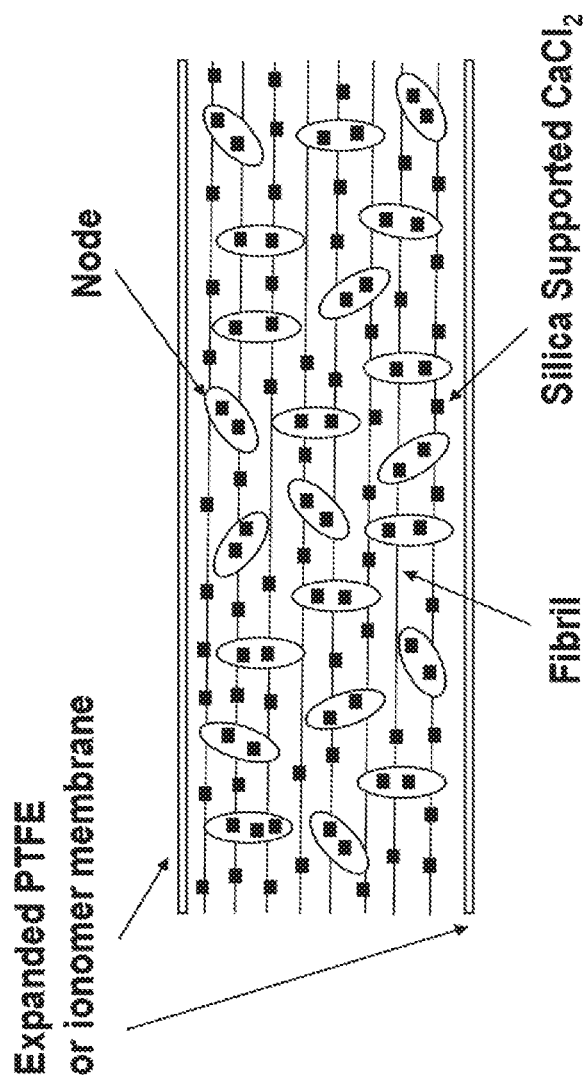
FIG. 14 is a schematic drawing of a porous fibrillated polymer tape supported by an expanded PTFE or ionomer membrane on each side.

Example 9: Fabrication of Supported $CaCl_2$/$SiO_2$ and PTFE Composite Tape The same procedure in Example 8 is used. However, a thin, porous membrane comprised of expanded PTFE (ePTFE), or expanded sulfur polytetrafluoroethylene (ionomer), can be used as a supporting membrane, and this process produced a tape with a thin membrane on both sides of the tape, as shown in FIG. 14. In addition to silica supported calcium chloride, other desiccants such as silica gel, bentonite clay, and 3A molecular sieve can also be used as filler in the polymer tape.

Example 10: Measurement of Corrosion Rate on Metals

Three types of metal specimens, 304 stainless steel, aluminum 6061, and copper 122, were used to test for corrosion caused by the calcium chloride containing desiccant. Each metal coupon is approximately 1 inch square and ⅛ inch thick. The surfaces were polished using 600 grit abrasive paper. The test specimens were exposed to various samples (powder, tapes without and with supporting membranes) under 60-80% relative humidity at 35° C. for 3 hours, followed by a 1 hour exposure in a convection oven at 125° C. The cycle was repeated for a total of 10 times over the course of 5 days. The mass of the test specimens were measured before and after the test to calculate the corrosion rate, and pictures of corrosion pits were taken.

TABLE 4

Corrosion rate of test specimens (mm per year)

| Sample | 304 Stainless Steel | Aluminum 6061 | Copper 122 |
|---|---|---|---|
| Blank | 7.62E-04 | — | 5.08E-03 |
| 20 wt % $CaCl_2$/$SiO_2$ powder | 2.54E-03 | 4.19E-02 | 1.21E-01 |
| 20 wt % $CaCl_2$/$SiO_2$ tape (no membrane) | 1.27E-03 | 2.54E-03 | 1.27E-02 |
| 20 wt % $CaCl_2$/$SiO_2$ tape (ePTFE) | 7.62E-04 | — | 1.78E-02 |
| 20 wt % $CaCl_2$/$SiO_2$ powder (ionomer) | 5.08E-04 | — | 1.02E-02 |
| 63 wt % $CaCl_2$/$SiO_2$ tape (no membrane) | 1.78E-03 | — | 1.78E-02 |
| 63 wt % $CaCl_2$/$SiO_2$ tape (ePTFE) | 1.02E-03 | — | 5.08E-03 |
| 63 wt % $CaCl_2$/$SiO_2$ powder (ionomer) | 1.02E-03 | — | 2.54E-03 |

Both 304 stainless steel and copper 122 have a small degree of corrosion in the presence of water vapor from the blank experiment. After exposure to the calcium chloride desiccant in its powder form, the corrosion rate increased for the three test specimens, and this increase is significant for both aluminum and copper. However, the corrosion rate decreased to low levels (stainless steel and copper) or zero (aluminum) after the test specimens were exposed to the $CaCl_2$/$SiO_2$ desiccant in its PTFE tape form.

Figure 15:
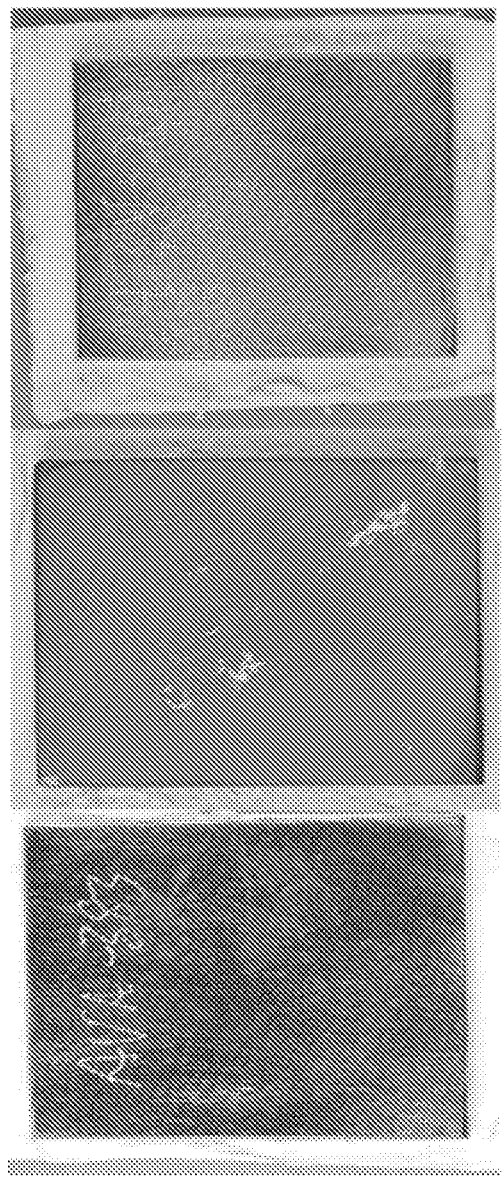
FIG. 15 depicts test specimens after exposure to 63 wt % $CaCl_2/SiO_2$ PTFE tape without a membrane (left to right: 304 stainless steel, copper 122, aluminum 6061).
Figure 16:
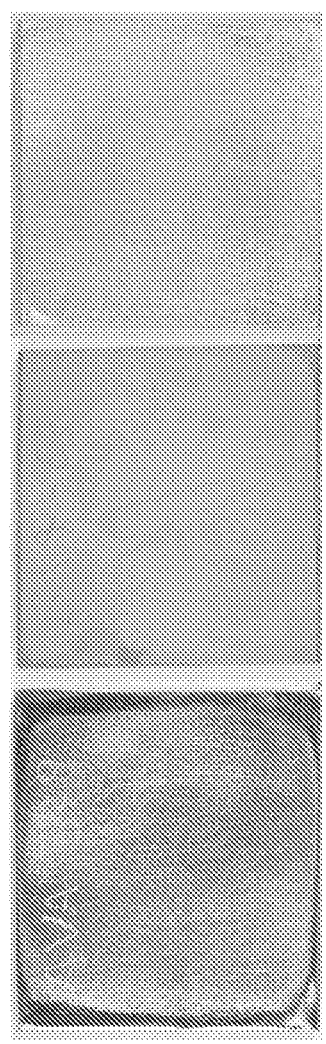
FIG. 16 depicts test specimens after exposure to 63 wt % $CaCl_2/SiO_2$ PTFE tape with expanded PTFE membrane (left to right: 304 stainless steel, copper 122, aluminum 6061).

FIG. 15 and FIG. 16 show photographs of the test specimens after exposure to the 63 wt % $CaCl_2$/$SiO_2$ PTFE tape without and with ePTFE membrane, respectively, as the sample contains the highest loading of salt. Even though the corrosion rate is low after exposure to the 63 wt % $CaCl_2$/$SiO_2$ PTFE tape without membrane, pitting corrosion is observed on both 304 stainless steel and copper 122 specimen (FIG. 15). In contrast, this localized corrosion is not observed on the specimens that were exposed to the 63 wt % $CaCl_2$/$SiO_2$ PTFE tape with ePTFE membrane (FIG. 16), indicating that the presence of these porous membranes may reduce corrosion rate by preventing direct contact between the metal and desiccant.

Example 11: Enclosure Cycling Test of Desiccants

To determine the effect of contamination on the desiccants over multiple cycles, the desiccant filled PTFE tapes were thermally cycled in an enclosure between 35 and 155° C. The enclosure had a controlled relative humidity of 20%, and contains 15 mL of octamethylcyclotetrasiloxane (D4)

and 15 mL of benzyl alcohol (BA). The desiccants were heated to 155° C. for 15 min, and cooled down to 35° C. for 90 min using two fans that circulate air in the enclosure. The cycle was repeated for multiple times and a piece of tape is removed after every 192 cycles for water vapor adsorption analysis.

Figure 17:
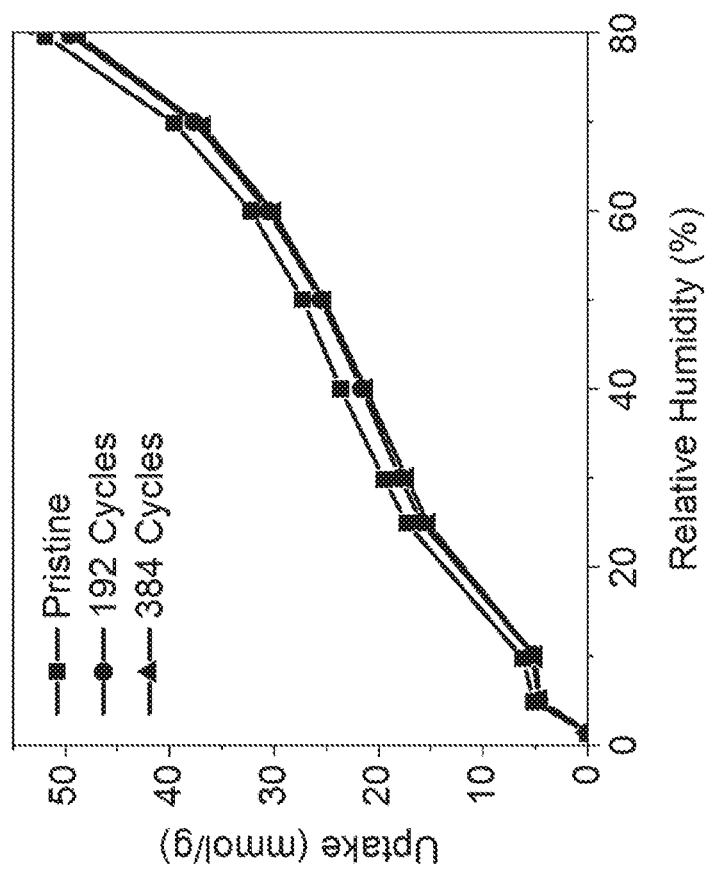
FIG. 17 depicts a water vapor adsorption isotherm of a 63 wt % $CaCl_2/SiO_2$ PTFE tape at 80% loading.
Figure 18:
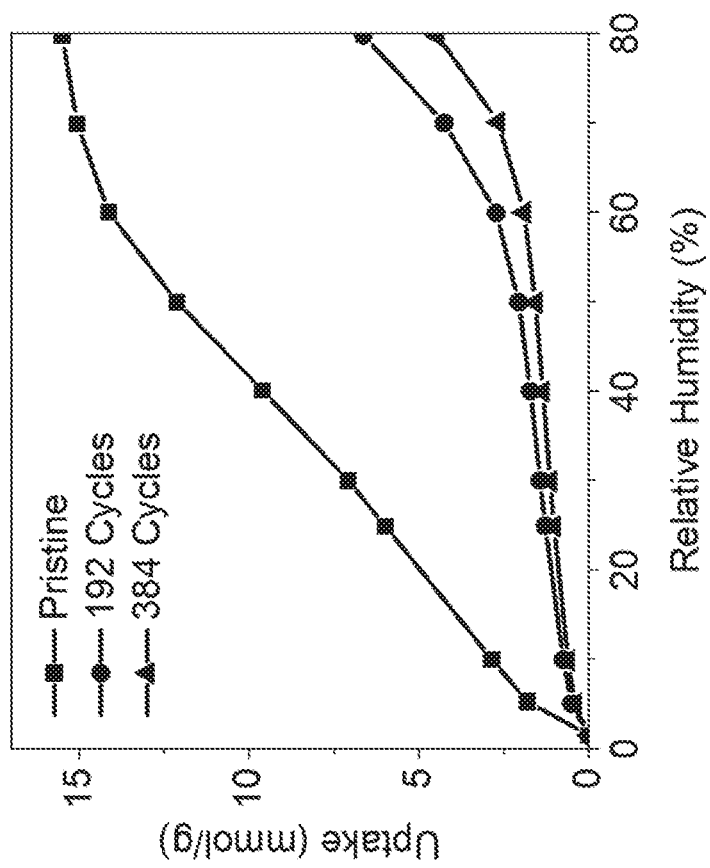
FIG. 18 depicts a water vapor adsorption isotherm of a silica gel PTFE tape at 80% loading.
Figure 19:
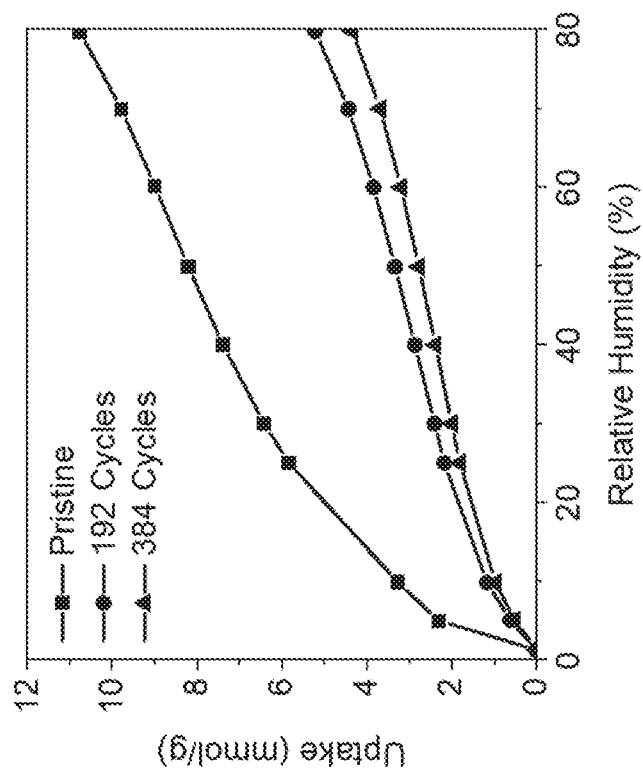
FIG. 19 depicts a water vapor adsorption isotherm of bentonite clay PTFE tape at 80% loading.
Figure 20:
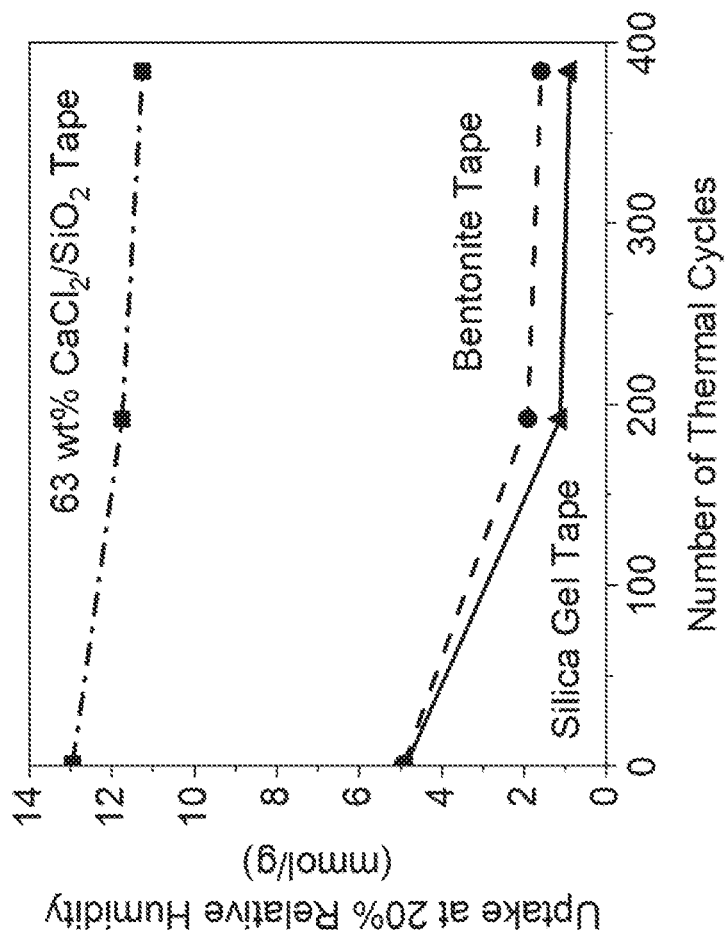
FIG. 20 depicts the water vapor adsorption isotherm of bentonite clay PTFE tape (80% loading).

FIG. 17, FIG. 18 and FIG. 19 show the water vapor adsorption isotherms of the fresh and used samples. The water vapor uptake of the 63 wt % $CaCl_2/SiO_2$ PTFE tape only shows a small decrease after 384 cycles, but both silica gel and bentonite PTFE tapes show a large decrease in capacity. This indicates that the $CaCl_2/SiO_2$ PTFE desiccant tape still has a great resistance against contamination after multiple cycles. FIG. 20 shows the water vapor uptake of the tapes at 20% RH for comparison.

TABLE 5

Water vapor uptake (mmol/g) of desiccant filled PTFE tapes (80% loading) before and after cycling test

| RH (%) | 63 wt % $CaCl_2/SiO_2$ PTFE tape | | Silica Gel PTFE Tape | | Bentonite Clay PTFE Tape | |
|---|---|---|---|---|---|---|
| | Pristine | 384 cycles | Pristine | 384 cycles | Pristine | 384 cycles |
| 5 | 5.2 | 4.6 | 1.8 | 0.4 | 2.3 | 0.5 |
| 10 | 6.2 | 5.0 | 2.9 | 0.6 | 3.3 | 1.0 |
| 25 | 17.3 | 15.2 | 6.0 | 1.0 | 5.8 | 1.8 |
| 30 | 19.5 | 17.3 | 7.1 | 1.1 | 6.4 | 2.0 |
| 40 | 23.6 | 21.2 | 9.6 | 1.4 | 7.4 | 2.4 |
| 50 | 27.3 | 25.2 | 12.1 | 1.6 | 8.2 | 2.8 |
| 60 | 32.2 | 30.0 | 14.1 | 1.9 | 9.0 | 3.2 |
| 70 | 39.6 | 36.8 | 15.1 | 2.7 | 9.8 | 3.7 |
| 80 | 51.9 | 48.7 | 15.5 | 4.5 | 10.8 | 4.3 |

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

The invention claimed is:

1. An apparatus comprising:
an enclosure;
wherein the enclosure comprises one or more contaminants and water vapor;
wherein the one or more contaminants and water vapor are within an internal volume of the enclosure;
a device;
wherein the device is positioned at least partially within the enclosure or outside of the enclosure and sufficiently close to the enclosure to allow moisture to travel between the device and the internal volume of the enclosure to absorb water vapor within the internal volume of the enclosure;
wherein the device comprises:
a substrate loaded with a desiccant;
wherein the substrate comprises at least one polymer material;
wherein 50 to 90 wt % of the substrate is loaded with the desiccant;
wherein the desiccant comprises:
calcium chloride salt; and
a support material;
wherein 20 wt % to 70 wt % of the support material is impregnated with the calcium chloride salt;
wherein a water vapor capacity of the desiccant does not decrease by more than 17% after undergoing up to 384 adsorption/desorption cycles in the presence of the one or more contaminants and water vapor of the enclosure.

2. The apparatus of claim 1, wherein 20 wt % to 65 wt % of the support material is impregnated with the calcium chloride salt.

3. The apparatus of claim 1, wherein 70 wt % to 80 wt % of the substrate is loaded with the desiccant.

4. The apparatus of claim 1, wherein the enclosure comprises one of more of stainless steel, copper, or aluminum.

5. The apparatus of claim 1, wherein the support material has a pore volume ranging from 0.2 to 2.10 $cm^3/g$.

6. The apparatus of claim 1, wherein the support material has a pore volume ranging from 0.42 to 1.90 $cm^3/g$.

7. The apparatus of claim 1, wherein the support material has a surface area ranging from 273 to 1534 $m^2/g$.

8. The apparatus of claim 1, wherein the support material is comprised of a metal oxide.

9. The apparatus of claim 8, wherein the metal oxide comprises one or more of aluminum oxide or silicon dioxide.

10. The apparatus of claim 1, wherein the support material comprises activated carbon.

11. The apparatus of claim 1, wherein the support material comprises a metal organic framework.

12. The apparatus of claim 1, wherein the substrate is in the form of a tape, a tube, or a disc.

13. The apparatus of claim 1, further comprising at least one additional polymer material comprising at least one polymer membrane positioned on at least one side of the substrate.

14. The apparatus of claim 1, wherein the at least one polymer material comprises a fluoropolymer or an expanded fluoropolymer.

15. The apparatus of claim 14, wherein the expanded fluoropolymer is expanded polytetrafluoroethylene (ePTFE).

16. The apparatus of claim 1, wherein the at least one polymer material comprises poly(ethylene-cotetrafluoroethylene) (ETFE), ultrahigh molecular weight polyethylene (UEMWPE), polyparaxylylene (PPX), polylactic acid, and any combination or blend thereof.

17. The apparatus of claim 1, wherein the one or more contaminants comprises one or more of: one or more siloxanes, one or more aliphatic alcohols, one or more aromatic alcohols, one or more nitrogen containing compounds, or one or more other organic compounds;
wherein the one or more siloxanes comprises one or more of: hexamethylcyclotrisiloxane, octamethylcyclotetrasiloxane, decamethylcyclopentasiloxane, dodecamethylcyclohexasiloxane, tetradecamethylcycloheptasiloxane, hexamethyldisiloxane, octamethyltrisiloxane, decamethyltetrasiloxane, or dodecamethylpentasiloxane;
wherein the one or more aliphatic alcohols comprises one or more of: 2-ethyl-hexanol or dodecanol;
wherein the one or more aromatic alcohols comprises one or more of: benzyl alcohol or 2,4-di-tert-butylphenol;
wherein the one or more nitrogen containing compounds comprises one or more of N-methyl-2-pyrrolidone, dibutylamine, dibutylformamide, or caprolactam;
wherein the one or more other organic compounds comprises one or more of: toluene, xylene, benzene, isopropyl benzene, trimethyl benzene, tetramethylbenzene, naphthalene, caprolactam, 1-hydroxycyclohexyl phenyl ketone, acetophenone, benzaldehyde, heptanal, hexanal, octahydro-4,7-methano-1H-indene, dipropylene glycol, diethylene glycol, diacetylbenzene, butanediol adipate, diphenyl sulfone, propylene carbonate, or tetradecane.

18. The apparatus of claim 1, wherein each absorption/desorption cycle is a moisture cycle, during which the desiccant is exposed to air having a relative humidity of from 20% to 95% so as to create a moisture gradient between the desiccant and the air.

19. The apparatus of claim 13, wherein the at least one additional polymer material is configured to decrease the transfer of desiccant particles from the device into the enclosure from 50% to 97% relative to a device with only a single polymer material.

20. A method comprising steps of:
a) obtaining a device comprising:
   a substrate loaded with a desiccant;
      wherein the substrate comprises at least one polymer material;
      wherein 50 to 90 wt % of the substrate is loaded with the desiccant;
      wherein the desiccant comprises:
         a calcium chloride salt; and
         a support material;
            wherein 20 wt % to 70 wt % of the support material is impregnated with the calcium chloride salt;
b) positioning the device at least partially within an internal volume of an enclosure or outside of the enclosure and sufficiently close to the enclosure to allow moisture to travel between the device and the enclosure;
   wherein the enclosure comprises one or more contaminants and water vapor within the internal volume;
c) absorbing moisture into the device from the internal volume of the enclosure;
d) desorbing moisture from the device to complete an absorption/desorption cycle;
e) repeating steps c)-d);
wherein a water vapor capacity of the device does not decrease by more than 17% after undergoing up to 384 absorption/desorption cycles in the presence of the one or more contaminants and water vapor of the enclosure.

* * * * *